US005668691A

United States Patent [19]

Ito et al.

[11] Patent Number: 5,668,691

[45] Date of Patent: Sep. 16, 1997

[54] ARRANGEMENT FOR GAS CIRCUIT BREAKER WITH REACTOR AND CAPACITOR CONNECTED IN SERIES AND METHOD FOR SETTING ITS CIRCUIT PARAMETER

[75] Inventors: Hiroki Ito; Takashi Moriyama; Kenji Kamei; Suenobu Hamano; Etsuo Nitta, all of Tokyo; Naoaki Takeji, Osaka; Koji Yamaji, Takamatsu; Masayuki Hatano, Tokyo, all of Japan

[73] Assignees: Mitsubishi Denki Kabushiki Kaisha, Tokyo; The Kansai Electric Power Co., Inc., Osaka; Electric Power Development Co., Ltd., Tokyo; Shikoku Electric Power Co., Inc., Takamatsu, all of Japan

[21] Appl. No.: 634,232

[22] Filed: Apr. 18, 1996

[30] Foreign Application Priority Data

Apr. 28, 1995 [JP] Japan .................................... 7-129317
Sep. 26, 1995 [JP] Japan .................................... 7-247861

[51] Int. Cl.$^6$ ................................ H02H 3/00; H01H 9/30

[52] U.S. Cl. ................................ 361/13; 361/2; 361/113; 361/115

[58] Field of Search ................................ 361/13, 2, 4, 8, 361/15, 17, 18, 117, 118, 115, 113

[56] References Cited

U.S. PATENT DOCUMENTS 4,578,730 3/1986 Tokuyama .................................. 361/4
5,402,297 3/1995 Ouchi et al. ................................ 361/4

FOREIGN PATENT DOCUMENTS 53-142679 12/1978 Japan ............................ H01H 33/59
57-138730 8/1982 Japan ............................ H01H 33/59
58-34527 3/1983 Japan ............................ H01H 33/59

OTHER PUBLICATIONS

Y. Yoshida et al., "A Study of DC–Current Interruption for GCB with Parallel Capacitor and Reactor", *Proceedings of the Fifth Annual Conference of Power & Energy Society, IEE of Japan*, (Session II, Short Papers), Jul. 27–29, 1994, pp. 824–826.

*Primary Examiner*—Jeffrey A. Gaffin
*Assistant Examiner*—Stephen Jackson
*Attorney, Agent, or Firm*—Burns, Doane, Swecker & Mathis, LLP

[57] ABSTRACT

A small-sized arrangement for a DC circuit breaker with a reactor and a capacitor connected in series is provided which includes a DC circuit breaker, a parallel impedance means with a suitably determined inductance and a suitable capacitance less in value than the inductance, and an energy-absorbing element. The parallel impedance means has a parallel reactor of a carefully selected inductance and a parallel capacitor of a smaller capacitance value. Determining the inductance and capacitance values of the parallel reactors and parallel capacitors employed in the parallel impedance means to satisfy a certain condition defined by specific formulas can cause the DC circuit breaker to take full advantage of the inherent performance thereof while allowing the interruption time to remain minimized, thereby achieving enhanced interruption performance. Since the capacitance of the parallel capacitor is rendered relatively smaller, the device can be small in size and low in cost.

18 Claims, 19 Drawing Sheets

Io=1.4 Θ=0.2 Ic=2.0
io=3500A L=400μH c=25μF
n=10MW θ=20μs

FIG. 9

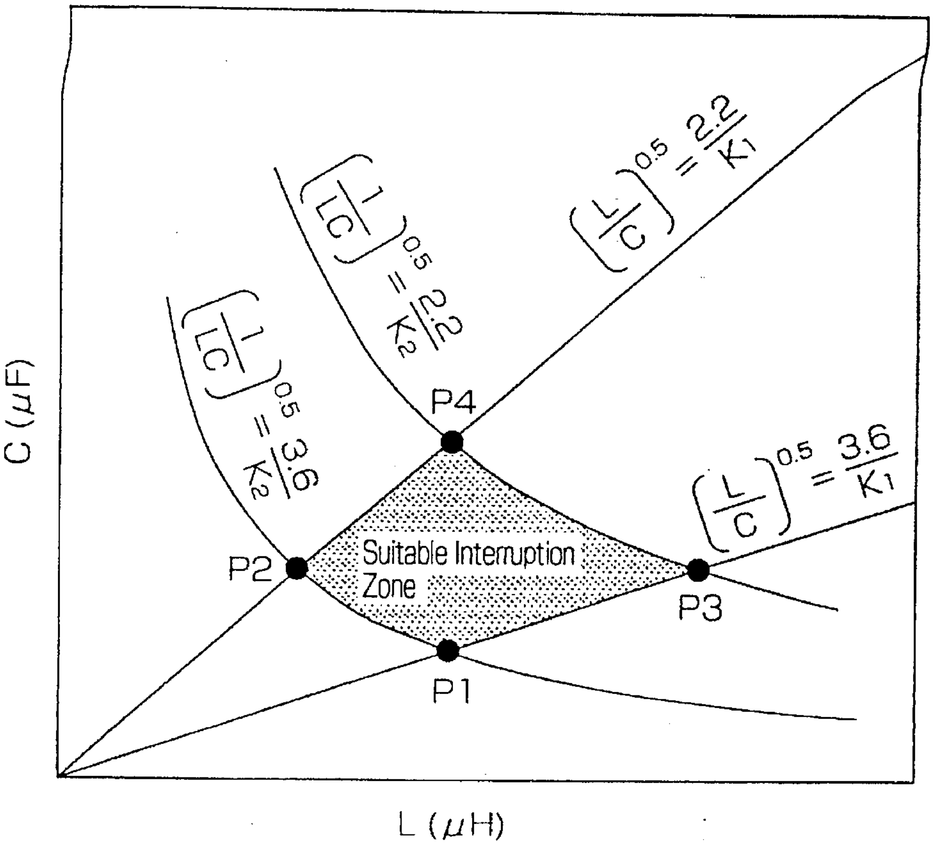

$$k_1 = \frac{(io/1000)}{Ic^4} \qquad k_2 = \frac{(io/1000)^{0.5}\ Ic}{10^4}$$

$$P_1(L1,C1) = \left(\frac{k_2}{k_1} \cdot \frac{k_1 k_2}{3.6^2}\right) = \left[3.16\times10^3 \frac{Ic^5}{io^{0.5}}\ (\mu H),\ 2.44\times10^{-4} \frac{io^{1.5}}{Ic^3}\ (\mu F)\right]$$

$$P_2(L2,C2) = \left(\frac{2.2k_2}{3.6k_1} \cdot \frac{k_1 k_2}{2.2\times3.6}\right) = \left[1.93\times10^3 \frac{Ic^5}{io^{0.5}}\ (\mu H),\ 3.99\times10^{-4} \frac{io^{1.5}}{Ic^3}\ (\mu F)\right]$$

$$P_3(L3,C3) = \left(\frac{3.6k_2}{2.2k_1} \cdot \frac{k_1 k_2}{2.2\times3.6}\right) = \left[5.17\times10^3 \frac{Ic^5}{io^{0.5}}\ (\mu H),\ 3.99\times10^{-4} \frac{io^{1.5}}{Ic^3}\ (\mu F)\right]$$

$$P_4(L4,C4) = \left(\frac{k_2}{k_1} \cdot \frac{k_1 k_2}{2.2^2}\right) = \left[3.16\times10^3 \frac{Ic^5}{io^{0.5}}\ (\mu H),\ 6.53\times10^{-4} \frac{io^{1.5}}{Ic^3}\ (\mu F)\right]$$

FIG. 20

$$k_1 = \frac{(io/1000)}{lc^4} \qquad k_2 = \frac{(io/1000)^{0.5}\ lc}{10^4}$$

$$P_1(L1,C1) = \left(\frac{k_2}{k_1},\ \frac{k_1k_2}{3.6^2}\right) = \left[3.16\times10^3\,\frac{lc^5}{io^{0.5}}\ (\mu H),\ \frac{2.44\times10^{-4}}{k}\ \frac{io^{1.5}}{lc^3}\ (\mu F)\right]$$

$$P_2(L2,C2) = \left(\frac{2.2k_2}{3.6k_1},\ \frac{k_1k_2}{2.2\times3.6}\right) = \left[1.93\times10^3\,\frac{lc^5}{io^{0.5}}\ (\mu H),\ \frac{3.99\times10^{-4}}{k}\ \frac{io^{1.5}}{lc^3}\ (\mu F)\right]$$

$$P_3(L3,C3) = \left(\frac{3.6k_2}{2.2k_1},\ \frac{k_1k_2}{2.2\times3.6}\right) = \left[5.17\times10^3\,\frac{lc^5}{io^{0.5}}\ (\mu H),\ \frac{3.99\times10^{-4}}{k}\ \frac{io^{1.5}}{lc^3}\ (\mu F)\right]$$

$$P_4(L4,C4) = \left(\frac{k_2}{k_1},\ \frac{k_1k_2}{2.2^2}\right) = \left[3.16\times10^3\,\frac{lc^5}{io^{0.5}}\ (\mu H),\ \frac{6.53\times10^{-4}}{k}\ \frac{io^{1.5}}{lc^3}\ (\mu F)\right]$$

ARRANGEMENT FOR GAS CIRCUIT BREAKER WITH REACTOR AND CAPACITOR CONNECTED IN SERIES AND METHOD FOR SETTING ITS CIRCUIT PARAMETER

BACKGROUND OF THE INVENTION

1. Field of the Invention

The present invention relates generally to high-voltage direct current (HVDC) transmission systems, and more particularly to a gas circuit arrangement interrupting a DC current in a line of an HVDC transmission system. The invention also relates to a capacity setting method for determining the capacity of a parallel reactor and a parallel capacitor for use in the circuit of this arrangement.

2. Description of the Related Art

Recently, as power systems require higher voltages, the circuit breakers adapted therein become more critical in the achievement of further enhanced current interruption performance. At present, the arrangement for a gas circuit breaker with a reactor and capacitor connected in series are becoming more widely used in interrupting DC line power systems. One of the presently available circuit breakers has been described, for example, in "Journal of Power-Energy Division Conference 1994 of the Institute of Electrical Engineers", No. 621, pp. 824–825. The circuit configuration of such an arrangement for a DC circuit breaker device is illustrated in FIG. 21, wherein the device includes a DC circuit breaker 1, a parallel impedance means consisting of a parallel reactor 2 and a parallel capacitor 3, an energy-absorbing element 4 connected in parallel with the series circuit of parallel capacitor 3 and parallel reactor 2 for absorbing any excess voltage (overvoltage) at the parallel capacitor 3, and a DC current carrying line 5 in a power system. The energy-absorbing element may alternatively be connected to the parallel capacitor 3 only.

The DC circuit breaker 1 is constituted by a presently available puffer type gas circuit breaker, the cross-section of which is illustrated in FIG. 22. The gas circuit breaker has a pair of contacts: a fixed contact 11 to allow the flow of the DC current of the device, and a movable contact 14 in a puffer cylinder 12 with a dielectric nozzle 13 fixed thereto. In the open state, an arc 17 is generated between the contacts 11, 14 when a piston rod 16 integrated with the movable contact 14 is moved with respect to the puffer piston 15 secured to the fixed contact 11. At this time, as the piston rod 16 moves, an arc-extinguishing gas 18, here $SF_6$, filled within the inner space defined by the movable contact 14, the puffer cylinder 12 and the puffer piston 15 is compressed to be sprayed onto the arc 17 through an opening 19.

The prior art device operates as follows. When the fixed contact 11, which carries the DC current of the puffer type gas circuit breaker, and the movable contact 14 are open-circuited, an arc 17 is generated between these contacts in substantially the same manner as in the alternate current (AC) interrupted state. In the case of DC current, however, simply spraying the DC arc with $SF_6$ gas may not be sufficient to interrupt and extinguish it successfully due to the fact that, unlike AC current, DC current does not periodically cross the current zero point.

To extinguish the arc, the parallel reactor 2 and the parallel capacitor 3 are thus coupled in parallel to the DC circuit breaker 1 causing the current to be commutated and also causing the arc current to oscillate to come closer to the current zero point. This permits the $SF_6$ gas 18 compressed by the puffer piston 15 to be blown out from the opening 19 and then sprayed against the arc 17 through the dielectric nozzle 13 thus forcing it to be extinguished.

A significant problem with the prior arrangement for a DC gas circuit breaker is that, while the parallel reactor and the parallel capacitor for commutation may play an important role in attaining amplification of the perturbation of the arc current, how to appropriately determine the exact values for these depending upon the actual DC interruption current value and the performance of DC circuit breaker employed still remains unknown.

Another problem of the prior art is that the method for setting the capacity is yet unknown in terms of determination of suitable reactance values of the capacitor and reactor used in the circuit breaker.

SUMMARY OF THE INVENTION

It is therefore an object of the present invention to provide a technique for maximizing the performance of a DC circuit breaker and attaining enhanced interruption characteristics with a shorter interruption time, by employing a specific commutating circuit having an optimal parallel reactor inductance.

It is another object of the invention to provide a breaker of small size and low cost which can take full advantage of the performance of a DC circuit breaker by optimizing small parallel-capacitor capacitance for suitable parallel-reactor inductance in a parallel impedance means.

It is a further object of the invention to provide a circuit breaker of high reliability, small size and low cost which can maximize the performance of a DC circuit breaker and attain enhanced interruption performance with a shorter interruption time by using a puffer type gas-blast circuit breaker therefor and by optimizing small parallel-capacitor capacitance for suitable parallel-reactor inductance in a parallel impedance means.

It is yet another object of the invention to provide a circuit breaker of high reliability, small size and low cost which can be applied to power systems of increased capacity by employing a plurality of series-connected circuit breakers of substantially the same ability, and which can maximize the performance of such DC circuit breakers and attain enhanced interruption performance with shorter interruption time by optimizing small parallel-capacitor capacitance for a suitable parallel-reactor inductance in a parallel impedance means.

It is a further object of the invention to provide an reactance and capacitance values setting method for circuit breakers which can successfully determine appropriate or optimum values for a parallel reactor and a small capacitor by using specific formulas, i.e., formulas (23) and (24) as will be given later in the description.

In accordance with the present invention, an arrangement for a DC circuit breaker includes a DC circuit breaker for controlling the flow of DC current in a power system, a parallel impedance means connected in parallel with this DC circuit breaker and which has a parallel capacitor and a parallel reactor, and an energy-absorbing element for use with the parallel capacitor, wherein the value of the parallel reactor is specifically arranged so that its inductive reactance (inductance) L (μH) is determined to satisfy a specific formula (25) as will be introduced later in the description.

In accordance with another aspect of the invention, an arrangement for a DC circuit breaker is specifically arranged in such a way that, for a suitable parallel-reactor inductance L (μH), the parallel-capacitor capacitance C (μF) is determined so as to satisfy the conditions as defined by formula (26) as will be presented later in the description.

In accordance with still another aspect of the invention, an arrangement for a DC circuit breaker is arranged in such a way that it has a parallel impedance circuit with small capacitor capacitance C (μF) properly determined with respect to suitable parallel-reactor inductance L (μH), and that a DC circuit breaker has a pair of fixed and movable contacts for allowing DC current to flow, and a gas spray section including a puffer piston and a nozzle for spraying an arc-extinguishing gas, such as $SF_6$ gas, toward an arc produced between the contacts in the open state of the breaker.

In accordance with a further aspect of the invention, an arrangement for a DC circuit breaker employs a number (k) of series-connected circuit breakers, which are substantially identical in ability. The circuit breaker includes a DC circuit breaker for controlling the flow of DC current in a power system, a parallel impedance means circuit connected in parallel to the DC circuit breaker and having a parallel capacitor and a parallel reactor, and an energy-absorbing element for use with the parallel capacitor, wherein the reactance values of such capacitor and reactor are specifically arranged, using a interruption current value $i_o$ (A) and the normalized critical interruption current $I_c$ of one circuit breaker, in such a manner that the parallel-reactor inductance L (μH) satisfies formula (34) whereas the parallel-capacitor capacitance C (μF) satisfies formula (35) as will be presented later in the description.

In accordance with a still further aspect of the invention, an reactance and capacitance values setting method is provided for determining the parallel-capacitor capacitance C (μF) and the parallel-reactor inductance L (μH), by using formulas (23), (24) given later, so that the reactance values fall within a specific zone satisfying both of the formulas.

Other objects and advantages of the present invention will become apparent from the detailed description given hereinafter. It should be understood, however, that the detailed description and specific embodiments are given by way of illustration only since various changes and modifications within the scope of the invention will become apparent to those skilled in the art from this detailed description.

BRIEF DESCRIPTION OF THE DRAWINGS

FIG. 9 is a diagram showing the zone of a parallel-reactor inductance and a small parallel-capacitor capacitance which are suitably employed in the circuit breaker of the invention.

FIG. 20 shows the coordinate values of several cross points P1, P2, P3, P4 and of parameters $k_1$, $k_2$ shown in FIG. 19.

DETAILED DESCRIPTION OF THE INVENTION

Figure 1:
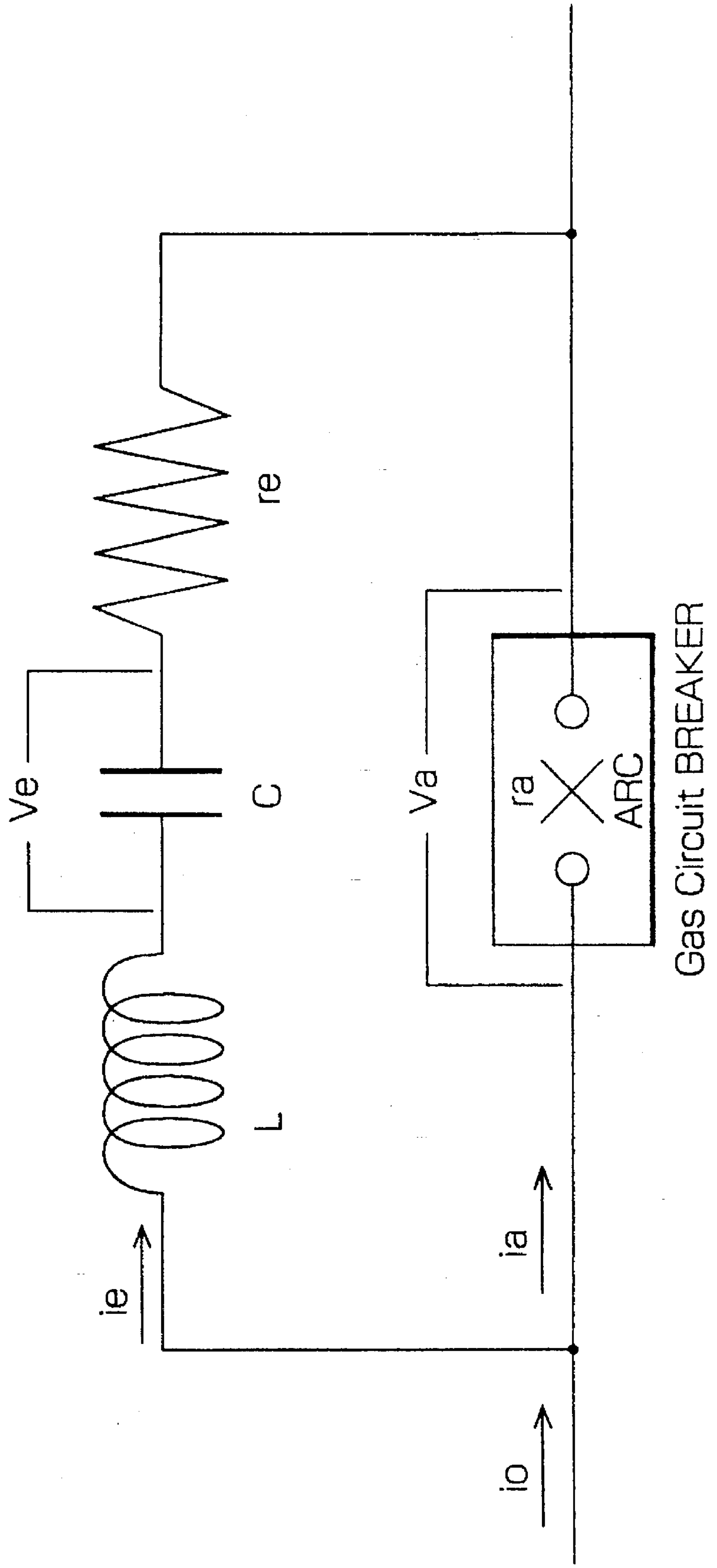
FIG. 1 is an analytical circuit diagram of an arrangement for a gas circuit breaker with a reactor and capacitor connected in series to interrupt a DC current in accordance with one preferred embodiment of the invention.

In order to find the way to determine optimum reactance and capacitance values for the parallel reactor and parallel capacitor employed in an arrangement for a DC circuit breaker depending upon the interruption current and the performance of the circuit breaker used, theoretical calculations using the Mayer model and experimental data have been used for comparison. Moreover, in order to reveal the general facts concerning different interruption current values and different circuit-breaker performances, analysis has been made under the condition that several quantity parameters such as voltage, current, time and the like are normalized.

The Mayer's arc model assumes that an arc is a columnar arc of constant diameter and uniform quality and that the loss of arc energy n is constant. Such a model may be given by the formula:

$$\frac{1}{r_a}\cdot\frac{dr_a}{dt}=\frac{1}{\theta}\cdot\left[1-\frac{v_a\times i_a}{n}\right] \quad (1)$$

where $V_a$ is arc voltage, $i_a$ is arc current, $r_a$ is arc resistance, and θ is arc time constant, which represents the time required for the arc conductance to drop at 1/e=0.37.

First, to find a suitable reactor inductance L (measured in H) and suitable small-capacitor capacitance C (F) for both the DC interruption current $i_o$ (A) and the circuit-breaker performance, normalization analysis was carried out as will be described below (note that, in the description and the accompanying drawings, upper-case letters are used to indicate dimensional values whereas lower-case letters are normalized values).

By introducing the loss of arc energy n (W) and the arc time constant θ (sec), voltage v, current i, resistance r and time t may be normalized as follows:

$$V=\frac{v}{\sqrt{nL/\theta}}, \quad (2)$$

$$I=\frac{i}{\sqrt{nC/\theta}}, \quad (3)$$

$$R=\frac{r}{\sqrt{L/C}}, \quad (4)$$

$$T=\frac{t}{\sqrt{LC}}. \quad (5)$$

The DC interruption current $i_o$ and arc time constant θ may be normalized as follows:

$$I_o=\frac{i_o}{\sqrt{nC/\theta}}, \quad (6)$$

$$\Theta=\frac{\theta}{\sqrt{LC}}. \quad (7)$$

In equation (6), $I_o$ is normalized interruption current, n is the loss of energy as occurred at the time of current interruption, and C is the capacitance of a parallel capacitor used.

A circuit configuration of this DC circuit breaker device is illustrated in FIG. 1, which was used for analysis. The basic equations of such a circuit are represented as:

$$i_o=i_a+i_e, \quad (8)$$

$$\frac{dv_e}{dt}=\frac{i_e}{C}, \quad (9)$$

$$v_e+L\frac{di_e}{dt}+r_e i_e=v_a, \quad (10)$$

$$v_a=r_a\times i_a, \quad (11)$$

$$\frac{1}{r_a}\cdot\frac{dr_a}{dt}=\frac{1}{\theta}\cdot\left[1-\frac{v_a\times i_a}{n}\right], \quad (12)$$

where $i_a$ is arc current, $i_e$ is commutation current, $v_e$ is voltage across the parallel capacitance, $r_e$ is inherent stray resistance.

Making the basic equations (8) to (12) normalized by using the normalized state quantity parameters defined by equations (2)–(5) and (7), we obtain equations (13)–(17) as follows:

$$I_o=I_a+I_e, \quad (13)$$

$$\frac{dv_e}{dT}=I_e, \quad (14)$$

$$\frac{dI_e}{dT}=v_a-V_e-R_eI_e, \quad (15)$$

$$V_a=R_a\times I_a, \quad (16)$$

$$\frac{1}{R_a}\cdot\frac{dR_a}{dT}=\frac{1}{\Theta}\cdot\left[1-\frac{V_a\times I_a}{\Theta}\right]. \quad (17)$$

As a consequence, the solutions of the basic equations (13)–(17) are found by use of the three specific parameters Θ, $I_o$, $R_e$ represented below:

$$\Theta=\frac{\theta}{\sqrt{L\cdot C}}, \quad (18)$$

$$I_o=\frac{i_o}{\sqrt{nC/\theta}}, \quad (19)$$

$$R_e=\frac{r_e}{\sqrt{L/C}}. \quad (20)$$

Typically, the circuit stray resistance $r_e$ remains small and can thus be rendered as $r_e \approx 0$; therefore, it can be said that interruption phenomena are principally controlled by the normalized arc time constant Θ and the normalized DC interruption current $I_o$.

Figure 2:
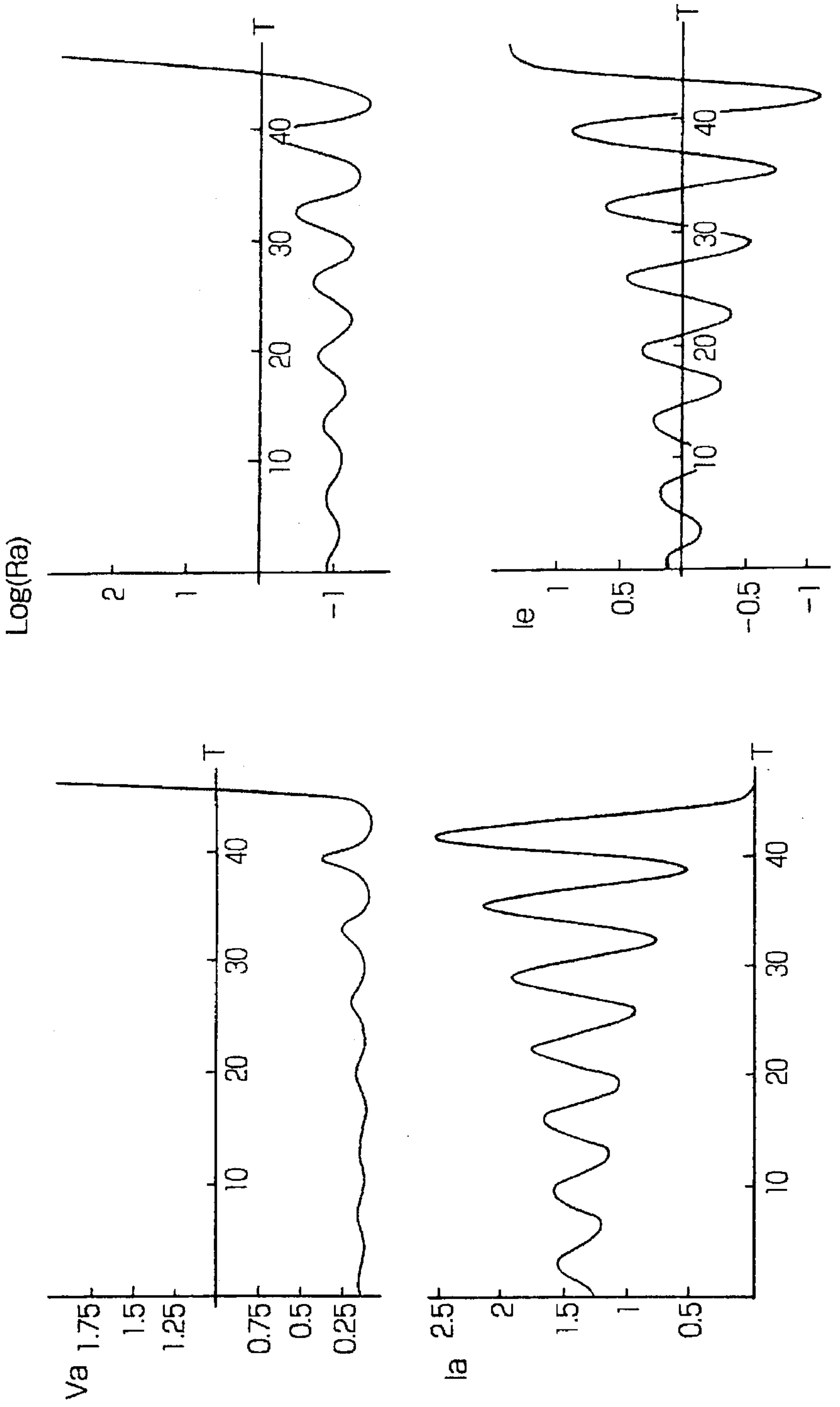
FIG. 2 illustrates several waveform diagrams showing variations with time of the normalized arc voltage, arc current, arc resistance and commutated current, which are examples obtained when the current interruption is successful.
Figure 3:
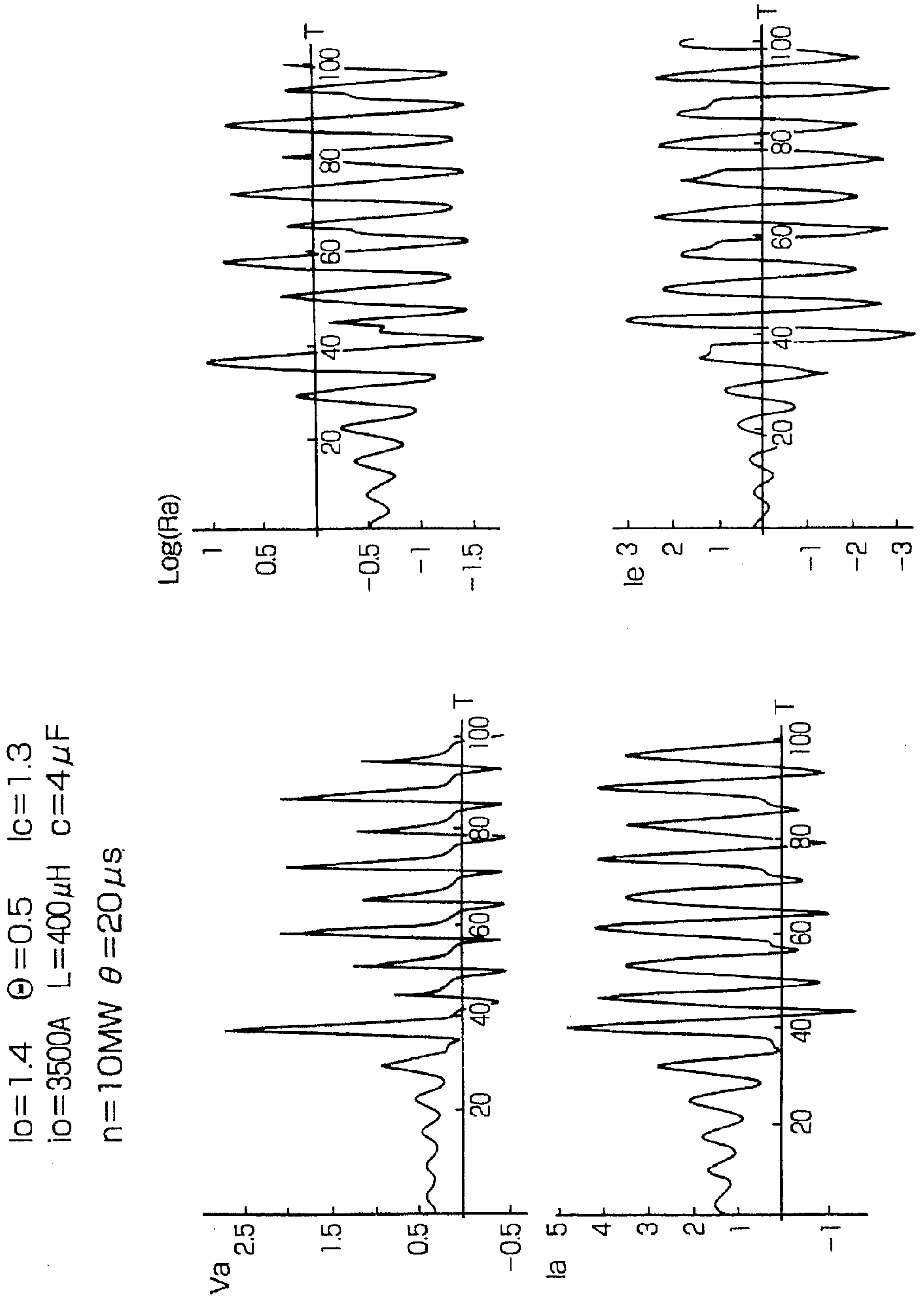
FIG. 3 illustrates several waveform diagrams showing variations with time of the normalized arc voltage, arc current, arc resistance and the commutated current, which are examples obtained when the current interruption fails.

The results of interruption analysis using the normalized state quantity parameters and equations (13)–(19) are shown in FIGS. 2 and 3. FIG. 2 is a waveform diagram presenting one example of current interruption which ended in success, and further showing how the normalized arc voltage, arc current, arc resistance and commutation current vary with time. On the other hand, FIG. 3 is a waveform diagram presenting one example of current interruption which ended in failure, and further showing variations with time of the normalized arc voltage, arc current, arc resistance and commutation current under such condition. FIG. 2 indicates the simulation results of arc-current/commutation current analysis using the Mayer model, wherein it is well demonstrated that, due to the mutual reaction of the parallel reactor and parallel capacitor of the commutating circuit and the negative voltage-to-current characteristic of the $SF_6$ gas arc, the arc voltage-current vibration expands causing the current zero point to form, and that current is commutated by the parallel impedance means to attain interruption of arc current.

More specifically, FIG. 2 shows the normalized arc voltage $V_a$, arc current $I_a$, arc resistance $R_a$ and commutation current $I_e$ under the assumption that the normalized DC interruption current $I_o$ is 1.4, and the normalized arc time constant Θ is 0.2; in this case, the arc current $I_a$ reached the zero point rendering interruption successful. Note that in FIG. 2, when the normalized arc time constant Θ is 0.2, the resulting critical normalized interruption current $I_c$ is 2.0. This means that interruption current can be carried out up to $I_c$=2.0; here, $i_o$=3,500 A, L=400 μH, C=25 μF, n=10 MW, and θ=20 μs.

It can be understood from viewing FIG. 2 that the normalized arc voltage current becomes higher in amplitude as the normalized arc time T increases, and that the arc resistance $R_a$ increases when the arc current $I_a$ reaches the zero point, which means that interruption is performed successfully. It can also be seen that the current $I_e$ of the commutating circuit increases when the arc current $I_a$ decreases.

On the other hand, FIG. 3 shows the normalized arc voltage $V_a$, arc current $I_a$, arc resistance $R_a$ and commutation current $I_e$ under the assumption that the normalized interruption current $I_o$ is 1.4, and the normalized arc time constant Θ is 0.5; in this case, while the arc current $I_a$ passes through the zero point, the oscillation continue causing interruption to fail. Note that in FIG. 3, when the normalized arc time constant Θ is 0.5, the resulting critical normalized interruption current $I_c$ is 1.3. This means that interruption current can be carried out up to $I_c$=1.3 only and becomes impossible at $I_c$=1.4 or more; here, $i_o$=3,500 A, L=400 μH, C=4 μF, n=10 MW, and θ=20 μs. Accordingly, as the normalized arc time constant Θ increases, the upper limit of current capable of being interrupted decreases.

It can be understood from viewing FIG. 3 that the normalized arc voltage current increases in amplitude as the normalized arc time T increases, and that the arc resistance $R_a$ can no longer increase in spite of the fact that the arc current $I_a$ repeatedly passes through the zero point, with the result that interruption can not be completed.

Figure 4:
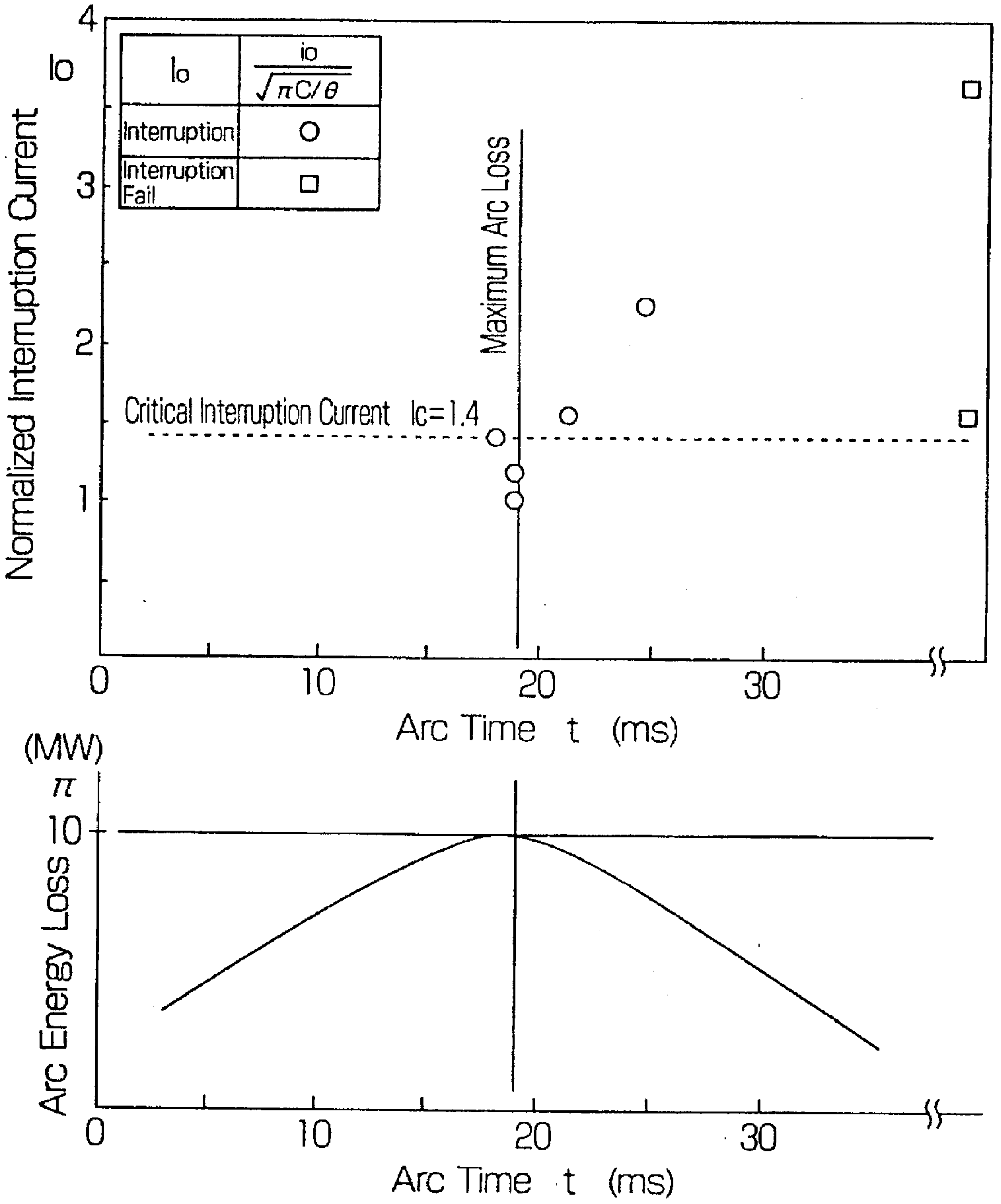
FIG. 4 illustrates a diagram plotting some values of the normalized interruption current $I_o$ of a circuit breaker A with respect to an arc time t and also a diagram showing the relation between the loss of arc energy and the arc time t in this case.

FIG. 4 shows some experimental data regarding the normalized interruption current $I_o$ of a 550 kV-class circuit breaker A with respect to the arc time t, together with the relation between the arc energy loss n and arc time t therein. A specific current value that corresponds to the upper limit of interruption success data of such normalized interruption current and also defines the lower limit of the interruption failure data is represented as $I_o$=1.4, which defines the critical normalized interruption current $I_c$ capable of being cut off or interrupted by the circuit breaker A. Additionally, with such circuit breakers, while the arc energy loss n is maximized at the arc time t=19 milliseconds (msec), the resultant current value which can be interrupted at this time may act as the critical normalized interruption current.

Based on the theoretical discussions mentioned above, the upper limit value of the normalized arc time constant for providing the normalized interruption current $I_o$=1.4 is given as Θ=0.44. Investigating the normalized arc time constant at the time of such normalized interruption current $I_o$=1.4, it has been found that interruption cannot take place in any way at Θ>0.44, while interruption can be done at Θ<0.44. This coincides with the experimental results; therefore, it is apparent that an interruption judgment can be made on different performance circuit breakers and different interruption current values based on the normalized analysis using the Mayer model.

Figure 5:
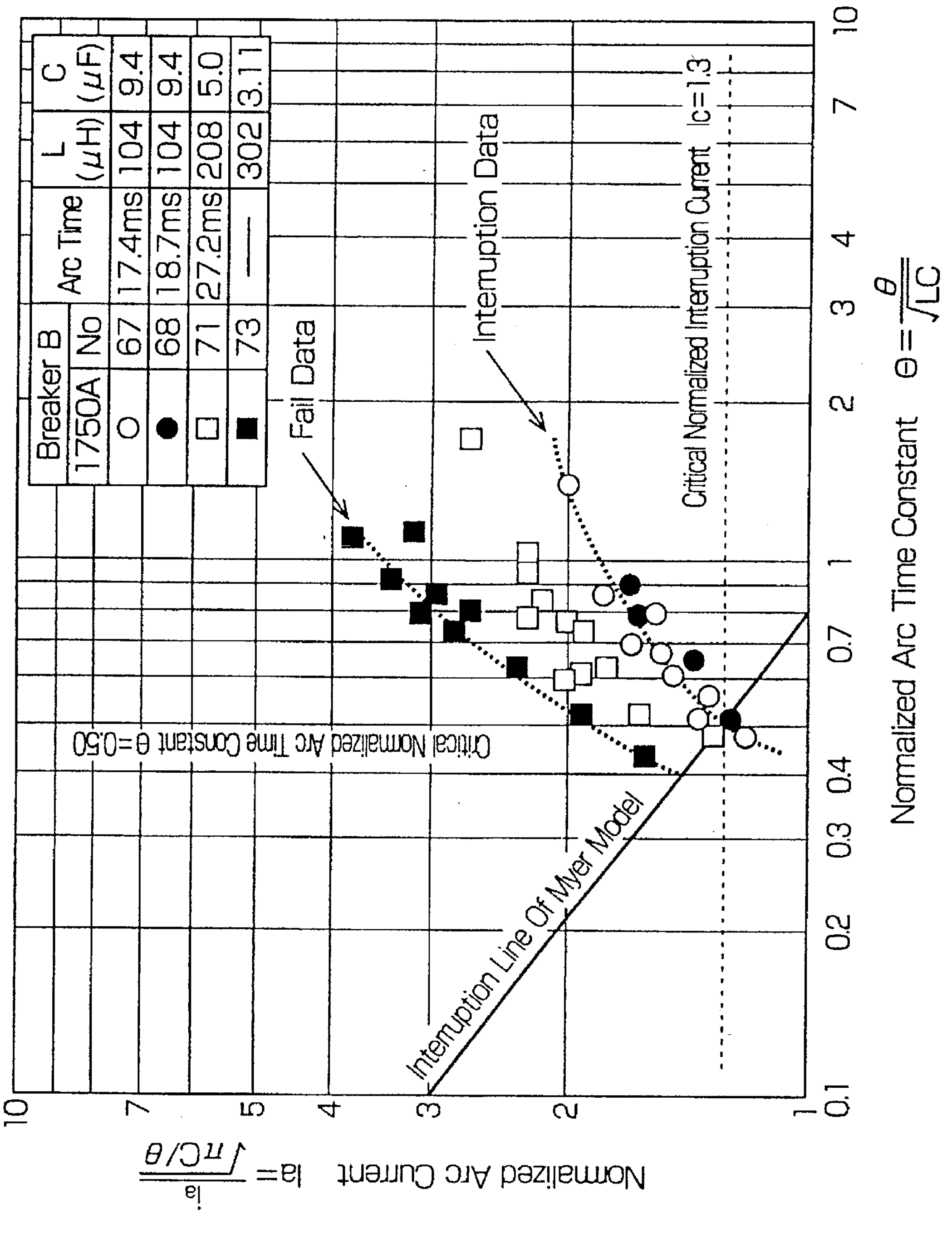
FIG. 5 is a diagram showing the relation between the normalized arc current $I_a$ and normalized arc time constant Θ in a circuit breaker B.
Figure 6:
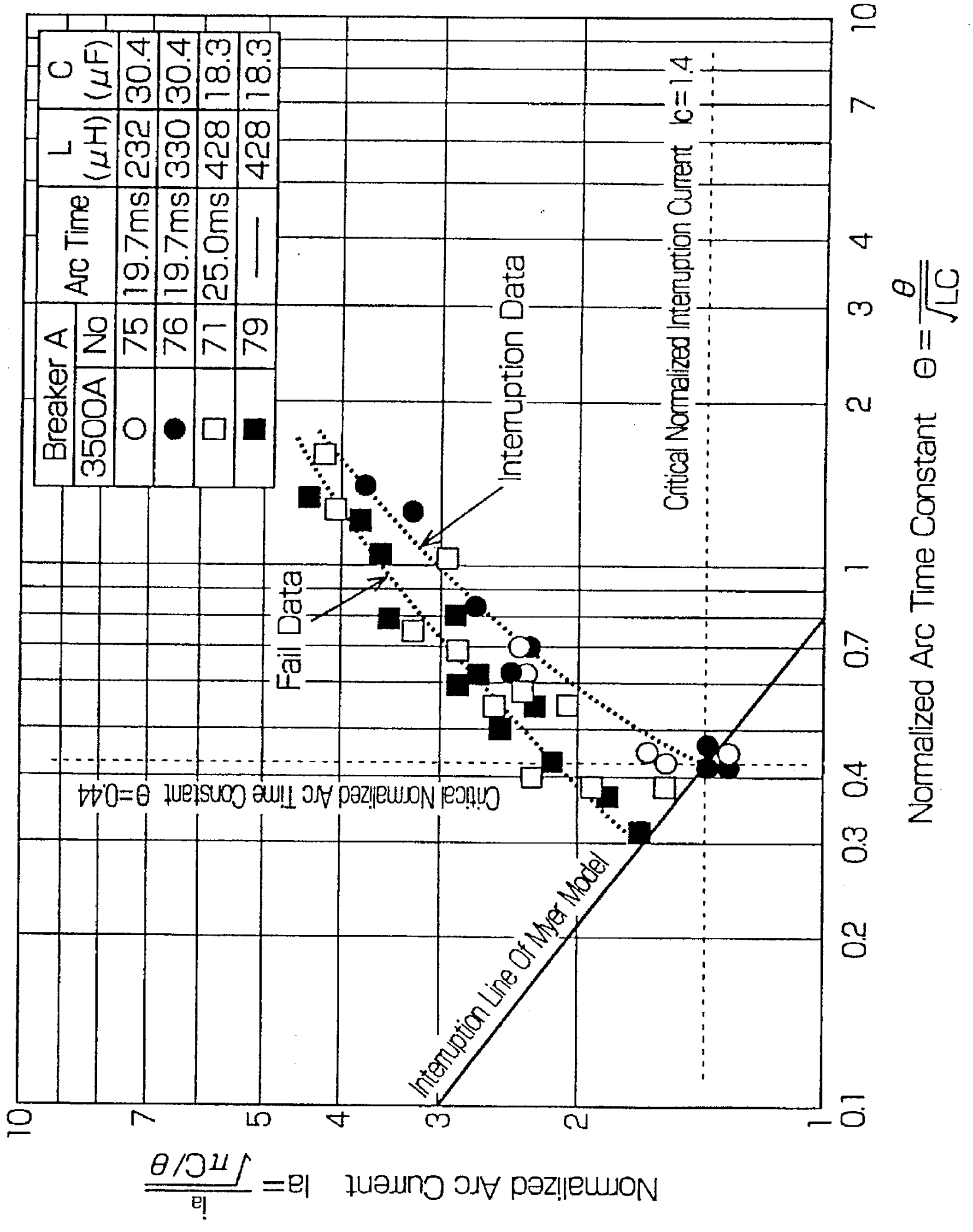
FIG. 6 is a diagram showing the relation between normalized arc current $I_a$ and normalized arc time constant Θ in the circuit breaker B.

With the Mayer model, it is possible to calculate the critical normalized interruption current $I_c$ for the normalized arc time constant Θ. And, as shown in FIGS. 5 and 6, the interruption line of Mayer model becomes linear. More specifically, any current with values falling within the zone defined below such a line can be interrupted, whereas any current above this line cannot in any way be interrupted. On the other hand, the experimental data tells us that the normalized arc current $I_a$ (relating to the normalized interruption current $I_o$) and the normalized arc time constant Θ decrease as the interruption point is approached; in the interrupt data, they cross the critical interruption of the Mayer model at exactly the same point. The value of such a point is inherent in the DC circuit breaker; here, this value is used as a specific index that indicates circuit-breaker performance by defining the critical normalized interruption current $I_c$ and the critical normalized arc time constant $Θ_c$.

Now by introducing a dimensional arc time constant $Θ_c$ to provide the critical normalized interruption current $I_c$ given as $I_c=i_o/(n_cC/θ_c)^{0.5}$, where $n_c$ is loss of arc energy (generally, $n_c$ is the maximum value of such an arc energy loss), it can be said that interruption is possible as long as the arc time constant during the ¼ cycle just before interruption is less than $Θ_c$, and that, if it is greater than $Θ_c$, successful interruption will no longer be possible.

FIG. 5 is a diagram showing the relation between the normalized arc current $I_a$ and normalized arc time constant Θ in another 550 kV-class circuit breaker B. In this case, the critical normalized interruption current $I_c$ is 1.3, whereas the interruption current $i_o$ is 1,750 A. Additionally, "No" indicated in FIG. 5 represents test numbers.

FIG. 6 is a diagram showing the relation between the normalized arc current $I_a$ and normalized arc time constant Θ in the previously presented 550 kV-class circuit breaker A. In this case, the critical normalized interruption current $I_c$ is 1.4, whereas the interruption current $i_o$ is 3,500 A. Similarly, "No" indicated therein represents test numbers.

As seen from the above, it is important that the interruption analysis is made based on the theoretical investigations in such a way as to find out the normalized interruption current $I_o$ defining the performance of circuit breakers, its associated critical normalized interruption current $I_c$ and the normalized arc time constant $Θ_c$.

Then, based on the normalized interruption current $I_o$ and the normalized arc time constant Θ thus obtained, a suitable parallel-reactor inductance and small parallel-capacitor capacitance is determined.

Figure 7:
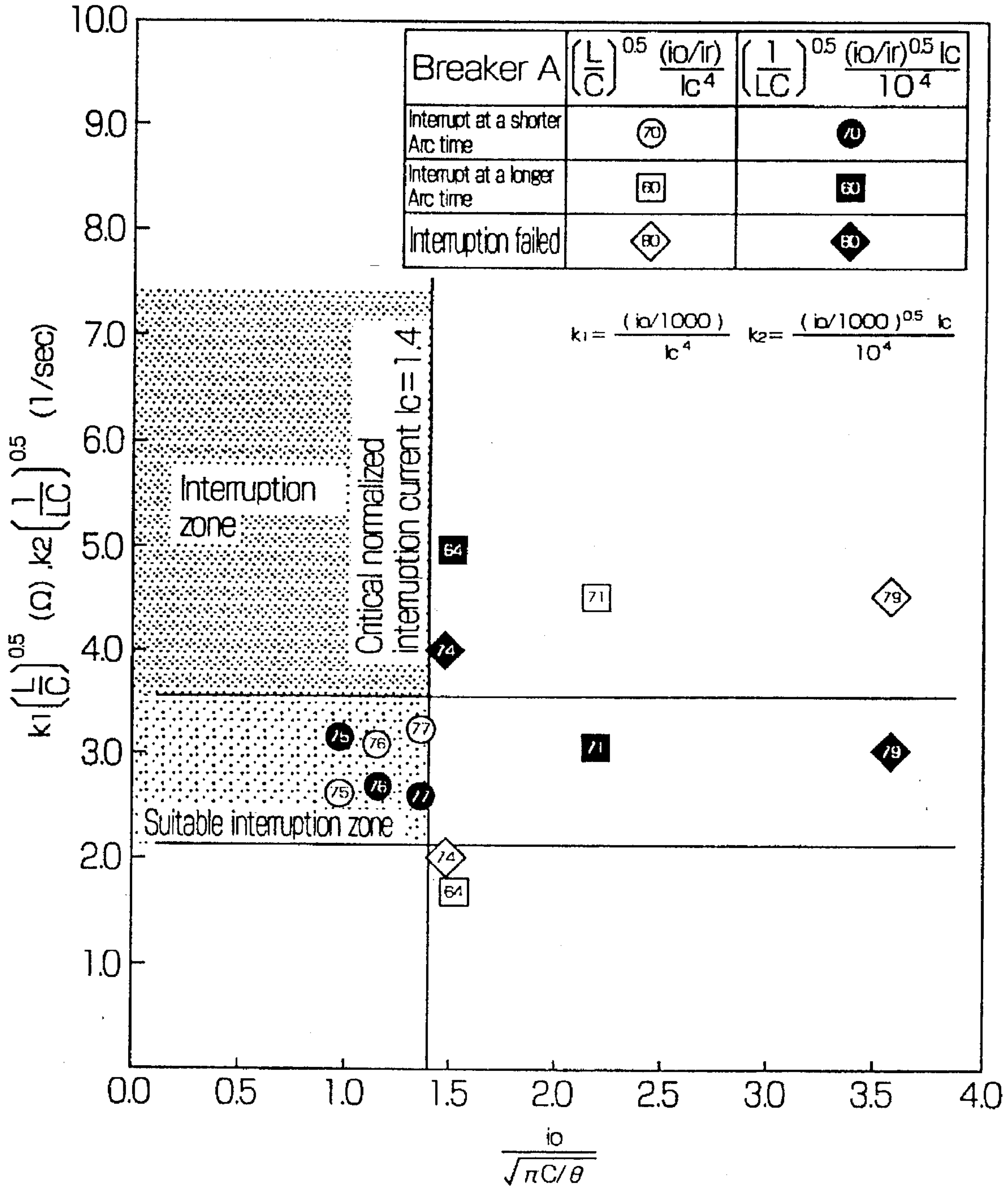
FIG. 7 is a diagram showing an interruption zone of a parallel reactance and a parallel capacitance for the circuit breaker A, wherein the transverse axis indicates normalized interruption current $I_o$.
Figure 8:
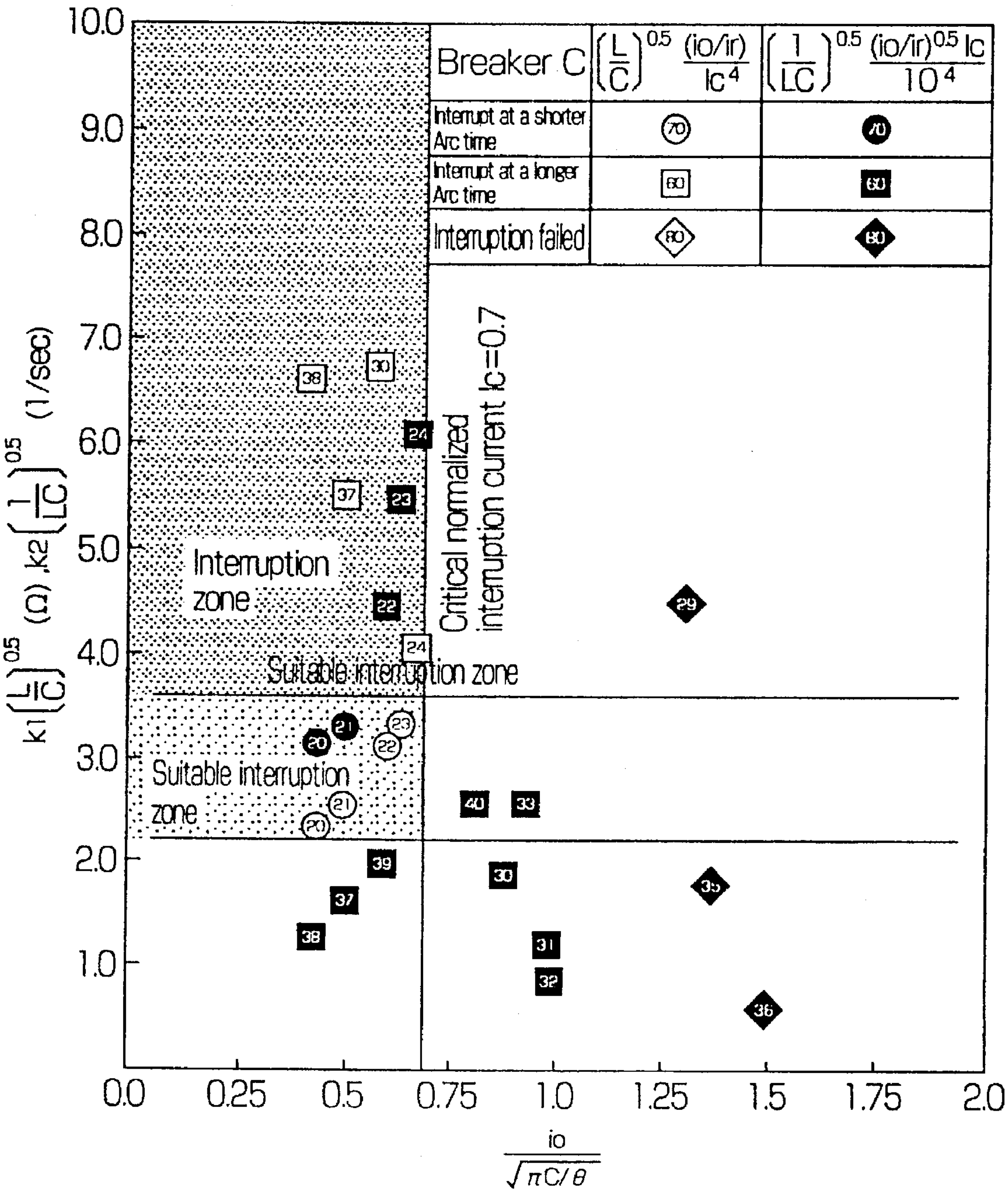
FIG. 8 is a diagram showing an interruption zone of a parallel reactance and a parallel capacitance for a circuit breaker C, the transverse axis thereof indicating normalized interruption current $I_o$.

FIGS. 7 and 8 are diagrams each of which shows a suitable interruption zone for the parallel reactor inductance and parallel-capacitor capacitance with respect to the circuit breaker A and that of a further circuit breaker C on the basis of the arc time relating to the normalized arc time constant Θ, wherein its transverse axis indicates the normalized interruption current $I_o$. To quantitatively express the suitable parallel-reactor inductance L and suitable small parallel-capacitor capacitance C as a generalized correlative equation being commonly applied to several circuit breakers of different performances (different in the value of the critical normalized interruption current $I_c$ of the normalized interruption current $I_o$) and different values of interruption current $i_o$, FIGS. 7 and 8 each show a relation between two specific parameters: a first parameter $k_1$ which is a multiple of a surge impedance $(L/C)^{0.5}$ (measured in Ω) for the normalized interruption current $I_o$ of the experimental data by a certain integer, and a second parameter $k_2$ which is a multiple of a frequency $(1/LC)^{0.5}$($sec^{-1}$). $(L/C)^{0.5}$ and $(1/LC)^{0.5}$ are newly introduced to specify L and C. Note here that these parameters $k_1$ and $k_2$ are required to contain $I_c$ and $i_o$ as variables in order to complete such generalized correlative equations commonly applied to circuit breakers of difference performances ($I_c$) and different interruption current values $i_o$. In each diagram, $i_r$=1,000 (A), and any numbers illustrated inside symbols "○", "□", "◇" are used to indicate test numbers. The same will be applied to all diagrams refer to later.

It can be understood from viewing FIGS. 7 and 8 that, for any one of interruption data (suitable interruption zone) with short arc time, the normalized interruption current $I_o$ in the transverse axis is less than the critical normalized interruption current $I_c$, and, at the same time, the values of the surge impedance $k_1(L/C)^{0.5}$ and frequency $k_2(1/LC)^{0.5}$ in the vertical axis range between "2.2" and "3.6". Attention should now be directed to the fact that, as a result of careful studies by use of statistical investigations, the multiple of the surge impedance $(L/C)^{0.5}$ and that of the frequency $(1/LC)^{0.5}$ are found to be defined as:

$$k_1 = \frac{(i_o/1000)}{I_c^4}, \quad (21)$$

$$k_2 = \frac{(i_o/1000)^{0.5} I_c}{10^4}. \quad (22)$$

In this way, $k_1$ and $k_2$ serve as suitable variables containing therein both the critical normalized interruption current $I_c$ of the normalized interruption current $I_o$ and the interruption current $i_o$.

Note that, in the description, the terminology "short arc time" is intended to mean that the interruption time is shortened; more specifically, it means that an arc current is successfully interrupted up until arc time t when the arc energy loss n is at its maximum in FIG. 4. This also means that the arc current was interrupted in a certain zone where the spraying speed of $SF_6$ gas toward the circuit-breaker contact is sufficiently high. The expression "long arc time" is intended to mean that the arc current is interrupted after the elapse of arc time t when the arc energy loss n is at its maximum in FIG. 4. This also means that the arc current is in a zone where the spraying speed of such an $SF_6$ gas against contact tends to decrease slightly.

Turning now to FIG. 9, the specific zone for suitable parallel-reactor inductance exhibiting a shortened interruption time for a short arc time and for suitable small parallel-capacitor capacitance exhibiting a shortened interruption time for a short arc time, for indicating the correlation of both the surge impedance and the frequency defined in FIGS. 7 and 8, with respect to the parallel reactor inductance L (μH) and the parallel capacitor capacitance C (μF), where the surge impedance is represented by:

$$2.2 \leqq k_1 \left(\frac{L}{C}\right)^{0.5} \leqq 3.6, \quad (23)$$

and the frequency is defined as:

$$2.2 \leqq k_2 \left(\frac{1}{LC}\right)^{0.5} \leqq 3.6, \quad (24)$$

In this drawing, the zone surrounded by two pairs of curved lines with four cross points P1–P4 at its corners defines the suitable interruption zone which assures a short interruption time capable of being commonly applied to several circuit breakers of different performances and different interruption current values.

As a consequence, it becomes possible by use of the equations (23), (24) to facilitate the method of suitably setting both the suitable parallel reactor inductance and the parallel capacitor capacitance. Note here that since equations (23), (24) are not in any way controlled by DC voltages, these equations may be applied throughout almost the full range of DC voltages.

This fact leads to the possibility of taking full advantage of the inherent performance of the circuit breaker employed. Here, the suitable parallel-reactor inductance L (μH) exhibiting a short interruption time is given by a range defined between the horizontally opposite cross points P2, P3 of the graph of FIG. 9, as:

$$1.93 \times 10^3 \frac{I_c^5}{i_o^{0.5}} \leqq L \leqq 5.17 \times 10^3 \frac{I_c^5}{i_o^{0.5}}. \quad (25)$$

For such a parallel reactor inductance L (μH) ranging from point P2 to point P3, the suitable small parallel-capacitor capacitance C (μF) is given by a range of the graph in FIG. 9 defined between vertically opposite cross points P1, P4 as:

$$2.44 \times 10^{-4} \frac{i_o^{1.5}}{I_c^3} \leqq C \leqq 6.53 \times 10^{-4} \frac{i_o^{1.5}}{I_c^3}. \quad (26)$$

It is recommended that the suitable parallel-reactor inductance L (μH) be more preferably defined by an area in the middle portion of the zone previously determined by the equation (25) which is represented by:

$$2.55 \times 10^3 \frac{I_c^5}{i_o^{0.5}} \leqq L \leqq 4.17 \times 10^3 \frac{I_c^5}{i_o^{0.5}}. \quad (27)$$

Also, the suitable small parallel-capacitor capacitance C (μF) may be defined as a smaller value in the lower portion of the zone previously determined by the equation (26), that is, represented as:

$$2.44 \times 10^{-4} \frac{i_o^{1.5}}{I_c^3} \leqq C \leqq 4.49 \times 10^{-4} \frac{i_o^{1.5}}{I_c^3}. \quad (28)$$

More preferably, to take maximum advantage of the performance of the circuit breaker, the optimum parallel-reactor inductance L (μH) may preferably be at point P1 to provide the shortest interruption time, wherein the parallel-reactor inductance L (μH) in this case is:

$$L = 3.16 \times 10^3 \frac{I_c^5}{i_o^{0.5}}. \quad (29)$$

The optimum smallest parallel-capacitor capacitance C (μF) should preferably be at the point P1 to exhibit the shortest interruption time, wherein the parallel reactor inductance L (μH) is:

$$C = 2.44 \times 10^{-4} \frac{i_o^{1.5}}{I_c^3}. \quad (30)$$

It is generally recommended that reactance value settings be made greater than those above.

Typically, while the parallel capacitor capacitance C is at a suitable constant value, interruption time decreases in length as the parallel reactor inductance L approaches the optimum value that satisfies the equations (25), (27) and (29) in this order. The cost of the resultant circuit breaker may decrease as the value of the parallel capacitor capacitance C is rendered smaller. Selecting larger reactance values within the specified zones in equations (30), (28) and (26) in this order enables the interruption time to be shortened even if the parallel reactor inductance L varies somewhat within such zone. However, cost will increase in this case.

When the DC interruption current value $i_o$ (A) in the equations (25), (26) is set to fall within the range of 0 to 5 kA, the critical normalized interruption current $I_c$ capable of being interrupted by the DC circuit breaker may range from 0.5 to 2, preferably, from 1.0 to 1.5 in the case of circuit breakers of ordinary-level performance.

Figure 21:
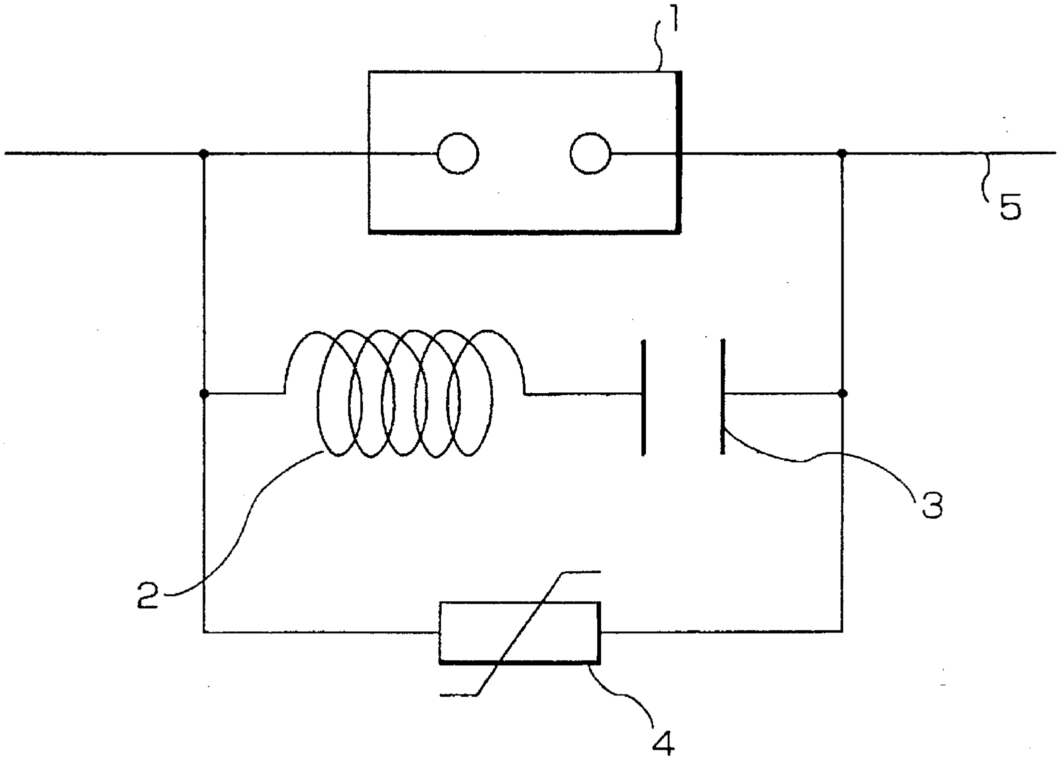
FIG. 21 PRIOR ART
FIG. 21 is a circuit diagram of a conventional arrangement for a DC circuit breaker.

The structural configuration of an arrangement for a DC circuit breaker of the present invention is similar to that of the prior art device shown in FIG. 21: the circuit breaker of the invention is arranged by the use of the DC circuit breaker 1, a parallel impedance means consisting of the parallel reactor 2 with a suitable reactance and a suitable small parallel capacitor 3, an energy absorbing element 4 and DC current carrying line 5 of a power system associated therewith.

A significant advantage of the embodiment of the present invention is that highly enhanced interruption performance can be achieved due to the fact that the DC circuit breaker employs parallel reactor 2 and small parallel capacitor 3 of specific reactance values determined in the way as has been described above, thus making it possible to take almost full or maximum advantage of the performance of the DC circuit breaker. Further, because the parallel-capacitor capacitance remains small, the cost of the device can also be reduced.

Figure 10:
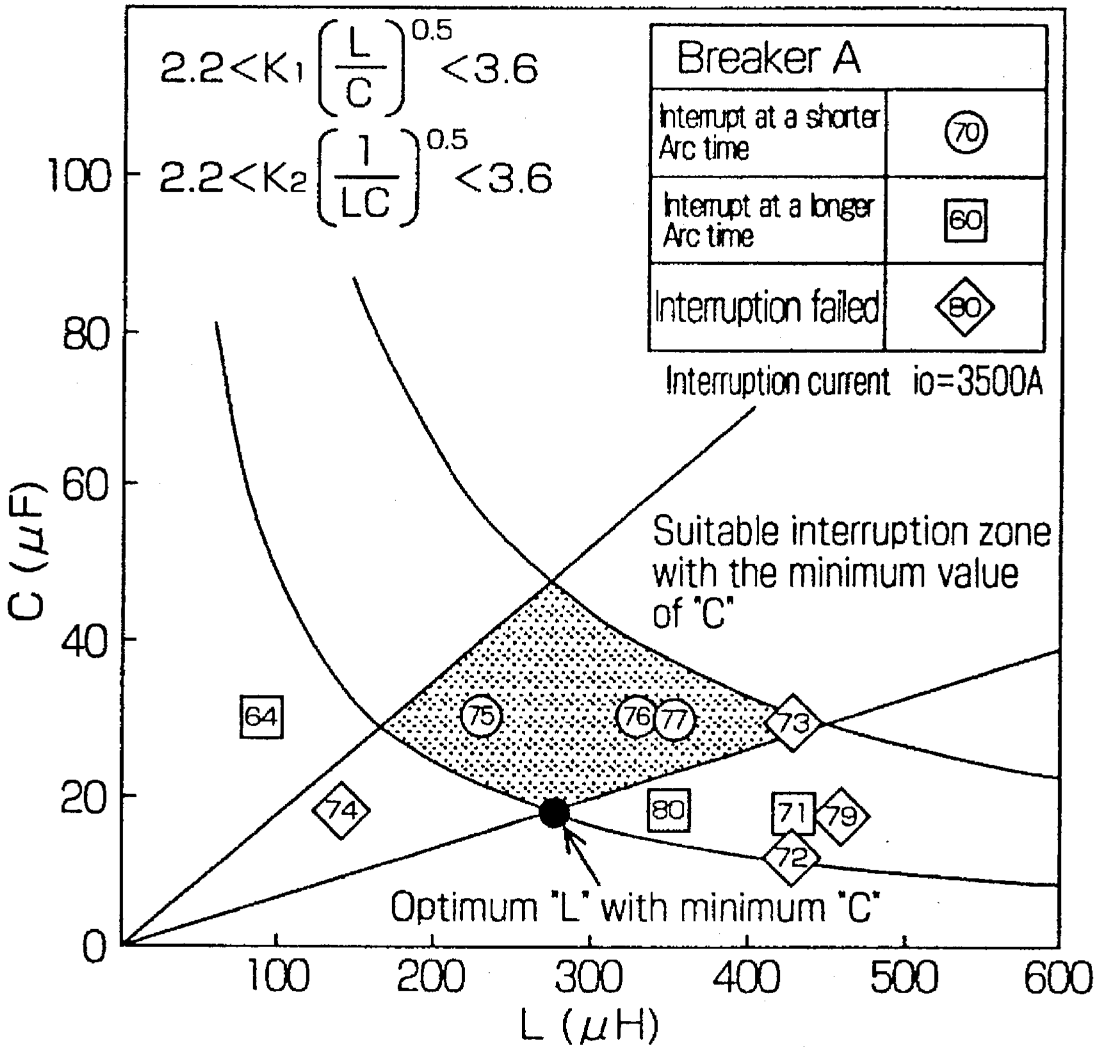
FIG. 10 is a diagram showing an interruption zone optimized for a parallel-reactor inductance and a parallel-capacitor capacitance in the circuit breaker B.
Figure 11:
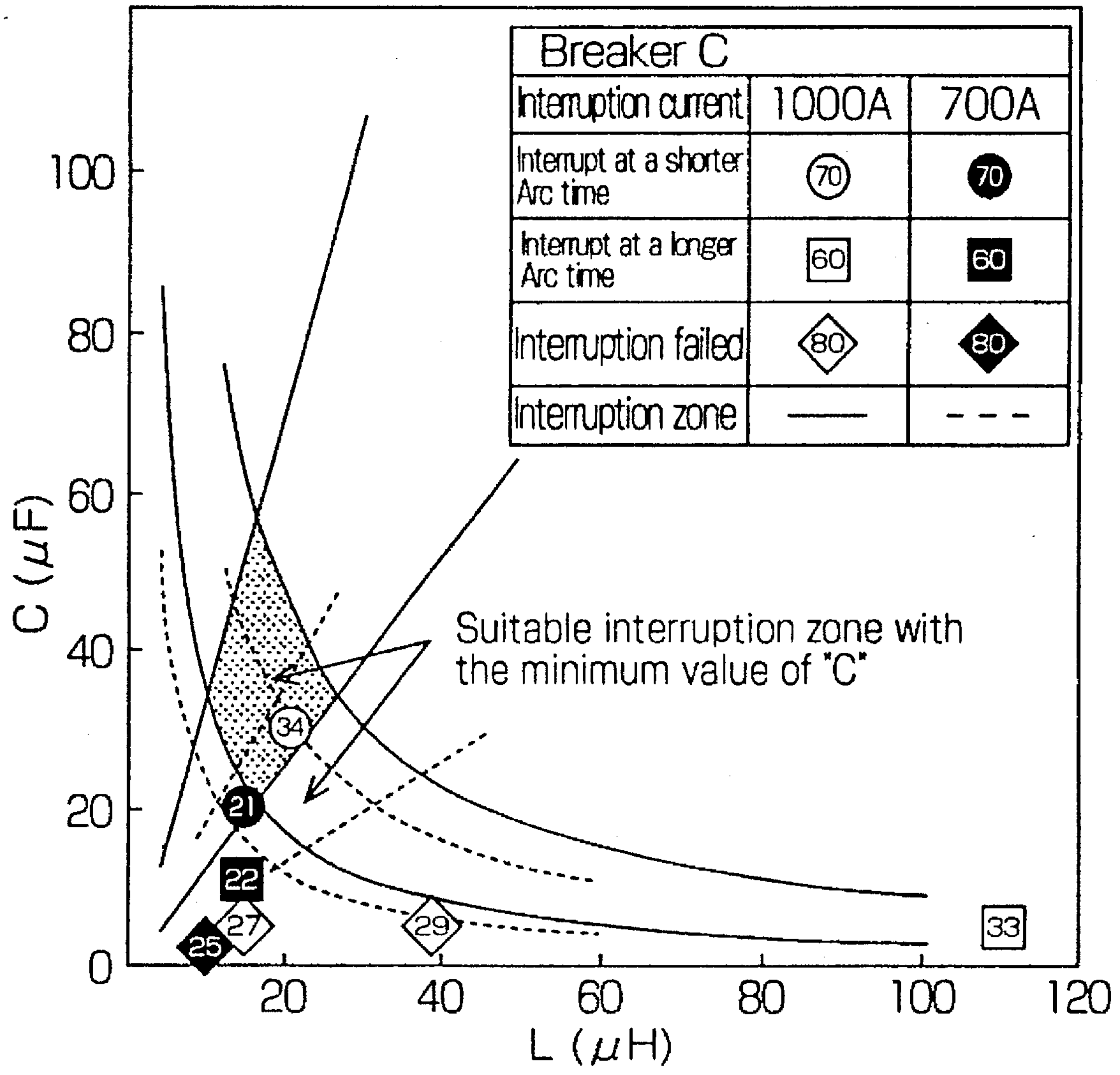
FIG. 11 is a diagram showing an interruption zone optimized for a parallel-reactor inductance and a parallel-capacitor capacitance in the circuit breaker C.

Turning now to FIGS. 10 and 11, in each is shown a suitably set interruption zone for the parallel reactor inductance and parallel capacitor capacitance: FIG. 10 shows the characteristics of the 550 kV-class circuit breaker A and its performance of the critical normalized interruption current $I_c$=1.4 when the DC interruption current is set as $i_o$=3,500 A; FIG. 11 shows characteristics of the 140 kV-class circuit breaker C and its performance of the critical normalized interruption current $I_c$=0.7 when the DC interruption current is $i_o$=700 A, 1,000 A. Each diagram has been prepared to compare the suitable interruption zone of the parallel reactor and parallel capacitor relative to the interruption current $i_o$ and critical normalized interruption current $I_c$ with corresponding experimental data. It can be understood from viewing these diagrams that all of the experimental data with a short arc time coincides with the suitable interruption zone of the parallel reactor and parallel capacitor which has been specifically determined by use of normalization analysis in accordance with the invention.

Figure 12:
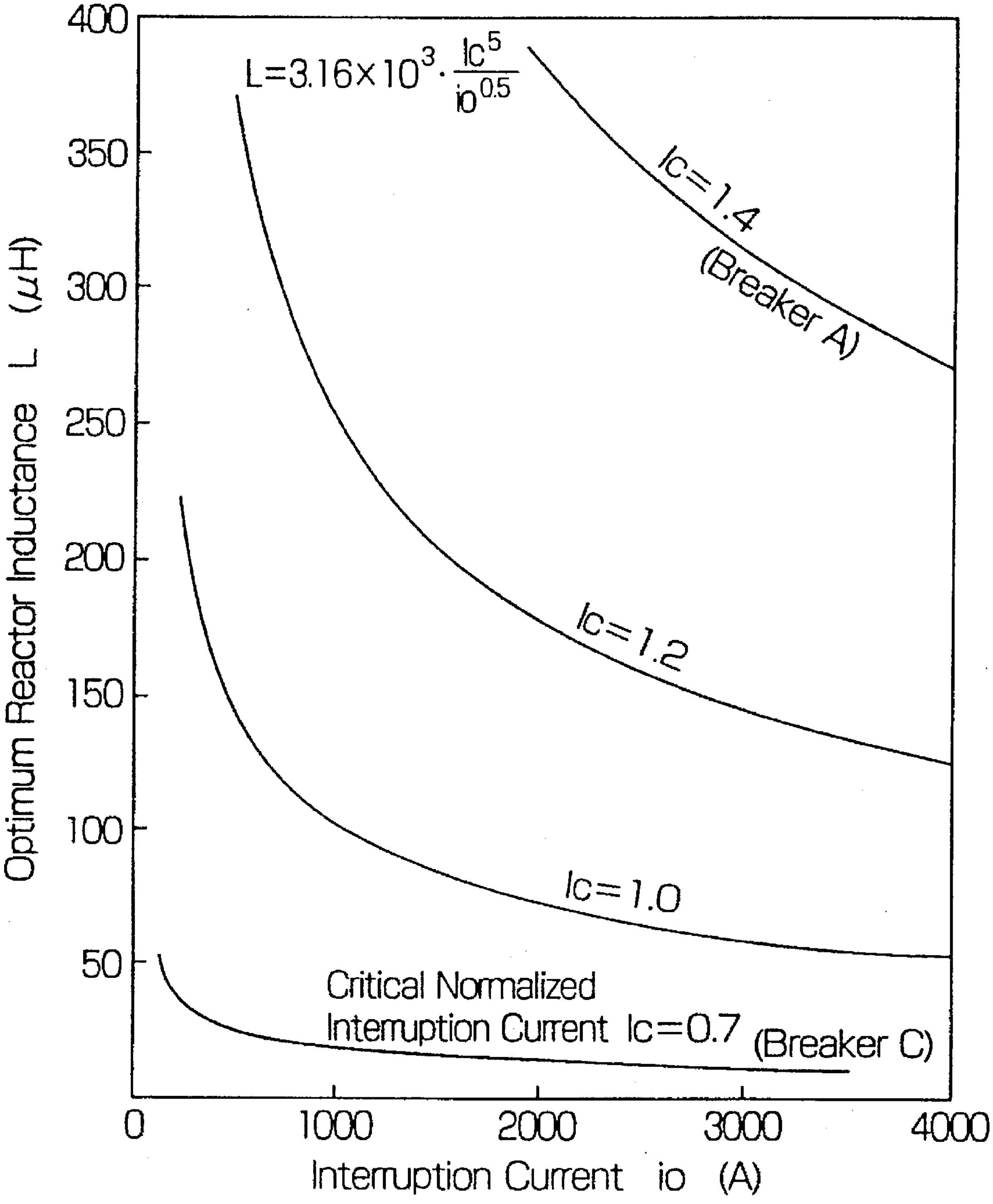
FIG. 12 is a diagram showing the optimal parallel-reactor inductance in accordance with the principles of the invention.
Figure 13:
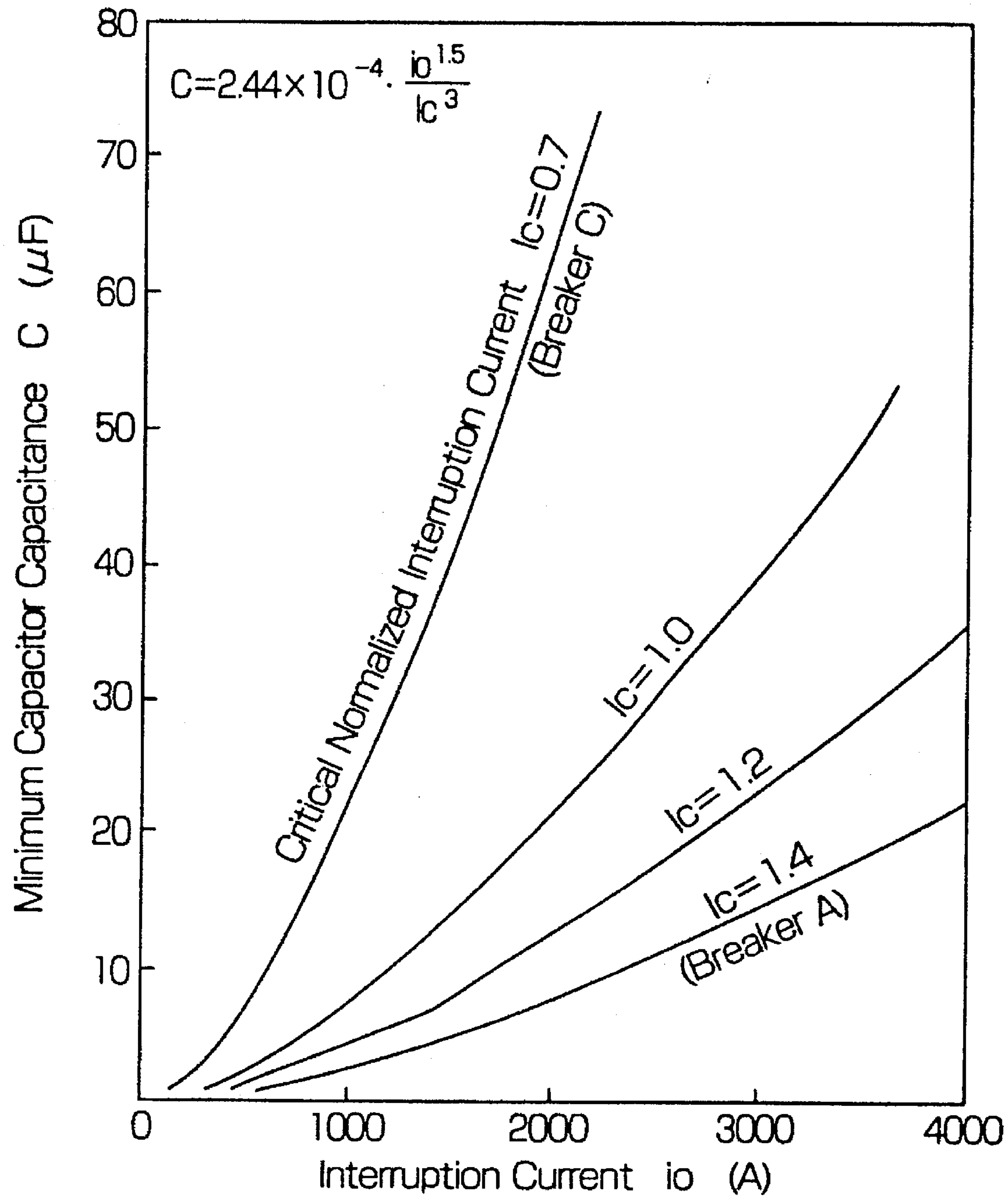
FIG. 13 is a diagram showing the minimal parallel-capacitor capacitance in accordance with the invention.

FIGS. 12 and 13 are diagrams showing the optimum parallel-reactor inductance and the minimum parallel capacitor capacitance, respectively, to demonstrate based on the normalization analysis how these reactance and capacitance values vary with respect to the interruption current $i_o$ and critical normalized interruption current $I_c$. Each diagram has been prepared to show a value of the point P1 relative to respective interruption currents $i_o$ and the critical normalized interruption current $I_c$. From viewing these graphs, it can be understood that the optimum parallel-reactor inductance L (μH) tends to slightly decrease as the interruption current $i_o$ increases, and, simultaneously, tends to increase as the critical normalized interruption current $I_c$ increases (i.e., as the circuit breaker's performance increase). In contrast, the minimum parallel capacitor capacitance C (μF) increases as the interruption current $i_o$ increases, and decreases as the critical normalized interruption current $I_c$ increases (i.e., as the circuit breaker's performance increases).

Figure 14:
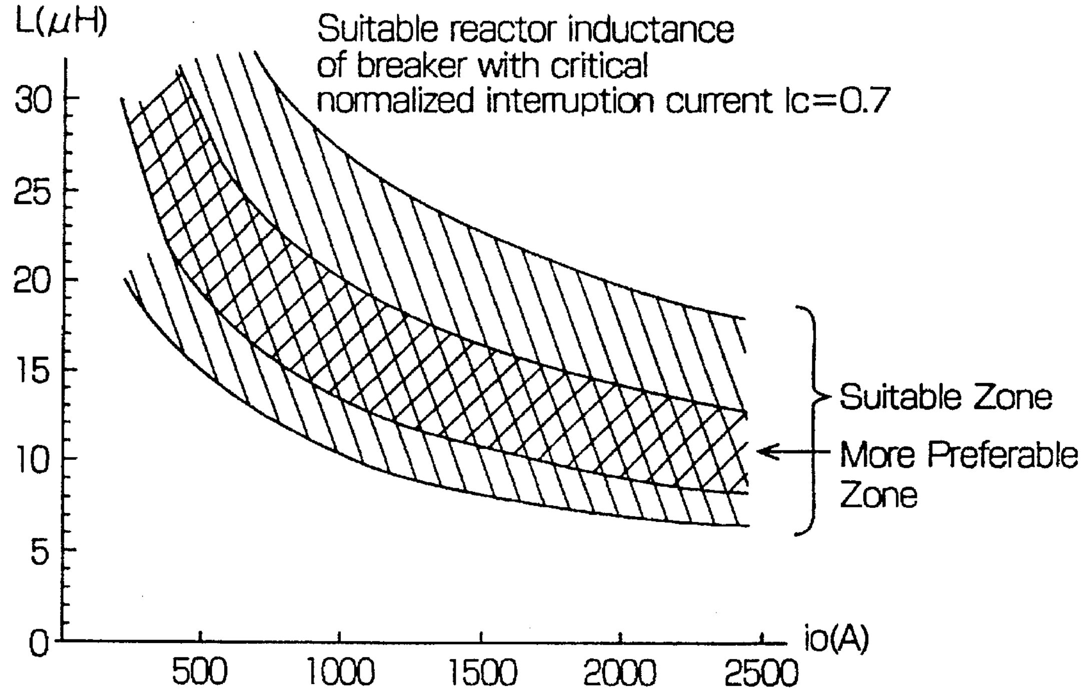
FIG. 14 is a diagram showing the zone of parallel-reactor inductance L (μH) suitable for interruption current $i_o$ in the circuit breaker of this invention.
Figure 15:
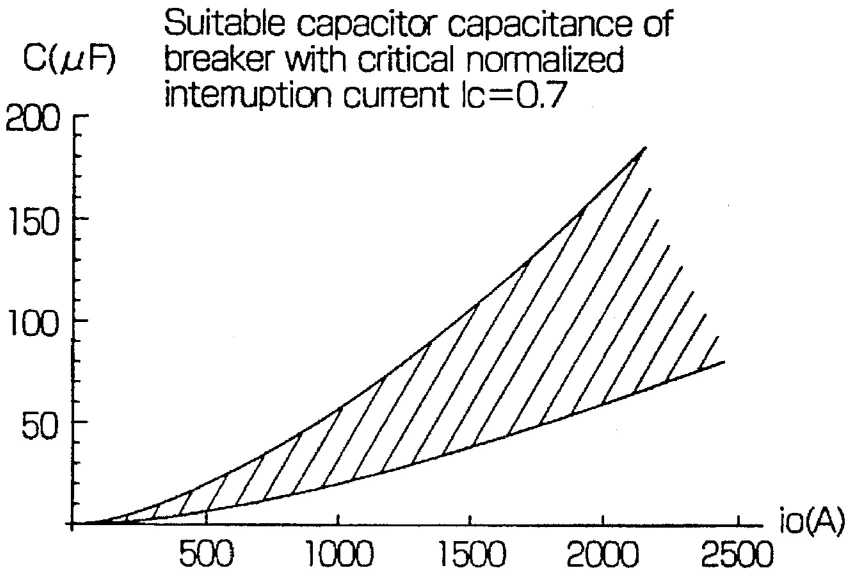
FIG. 15 is a diagram showing the zone of small parallel-capacitor capacitance C (μF) suitable for the interruption current $i_o$ in the circuit breaker of this invention.
Figure 22:
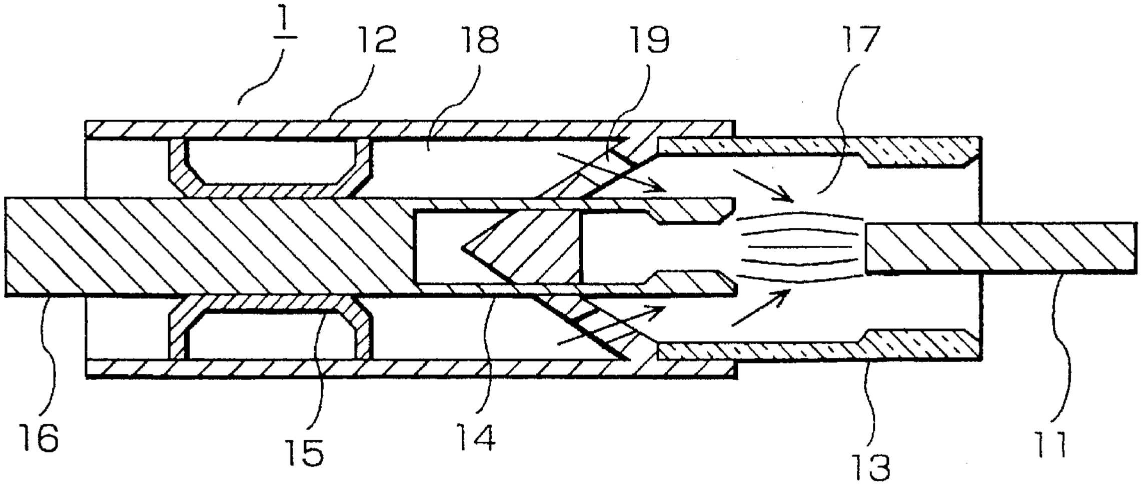
FIG. 22 PRIOR ART
FIG. 22 illustrates a cross-section of a conventional puffer type gas-blast circuit breaker.

FIGS. 14 and 15 show respective zones of suitable parallel-reactor inductance L (μH) and suitable small parallel-capacitor capacitance C (μF) with respect to the interruption current $i_o$ in a 140 kV-class circuit breaker having the critical normalized interruption current $I_c$=0.7. As is apparent from these diagrams, when a puffer type gas circuit breaker of the critical normalized interruption current $I_c$=0.7 is employed with a DC interruption current value of 1,000 A, the parallel reactor inductance L to be coupled to this circuit breaker as the parallel impedance means therefor ranges from 10.3 to 27.5 μH; preferably, from 13.6 to 22.2 μH; more preferably, 16.8 μH (the optimum value). The parallel capacitor capacitance C may range from 22.5 to 60.2 μF; more preferably, 22.5 to 41.1 μF where 22.5 μF is the minimum value. Additionally, the general configuration of such a puffer type circuit breaker may be similar to that of the prior art shown in FIG. 22.

In case where a puffer type gas circuit breaker of the critical normalized interruption current $I_c$=0.7 with a DC interruption current value of 2,000 A is employed, the parallel reactor inductance L being connected to such a circuit breaker as the parallel impedance means therefor may range from 7.3 to 19.5 μH; preferably 9.6 to 15.7 μH; more preferably, 11.9 μH (the optimum value). The parallel capacitor capacitance C in this case may range from 63.6 to 170 μF; preferably, 63.6 to 117 μF, 63.6 μF being the minimum value.

It should be noted that, according to the description in the "Journal of the Power-Energy Division Conference 1994 of the Institute of Electrical Engineers", No. 621, pp. 824–825, a suitable parallel-reactor inductance L (μH) has been reported to fall within the range of from 180 to 300 μH for the interruption current $i_o$=700 A in 140 kV-class circuit breakers. Taking this into account, it can be understood that the present invention is significantly distinguishable from such conventional teachings due to the considerable differences therebetween.

Figure 16:
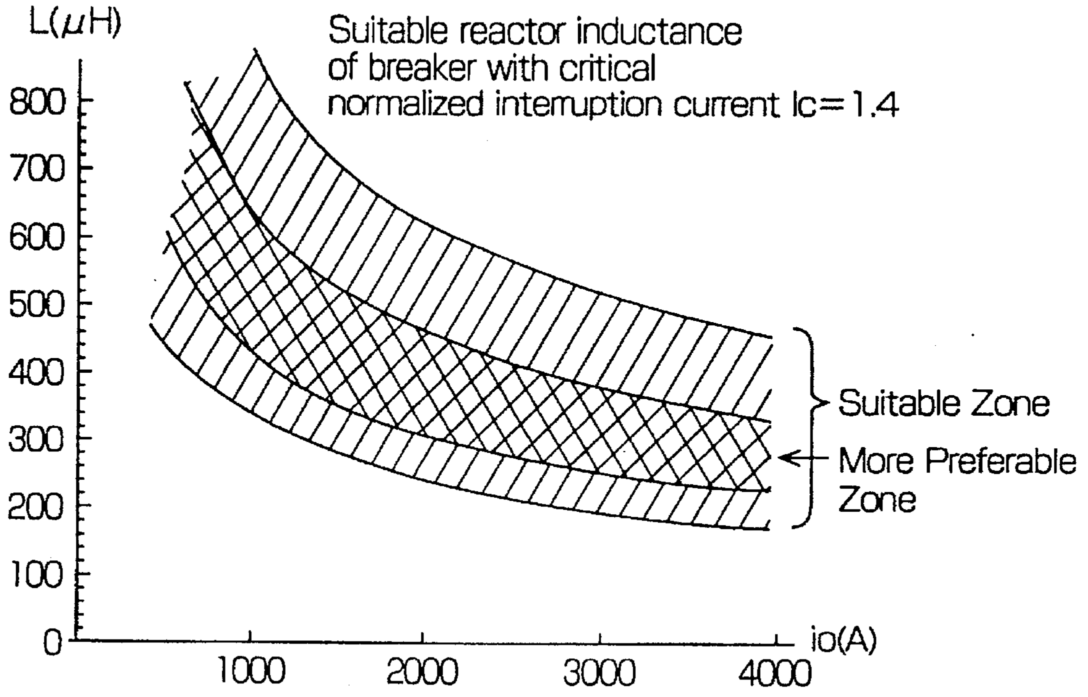
FIG. 16 is a diagram showing the zone of parallel-reactor inductance L (μH) suitable for the interruption current $i_o$ of the invention.
Figure 17:
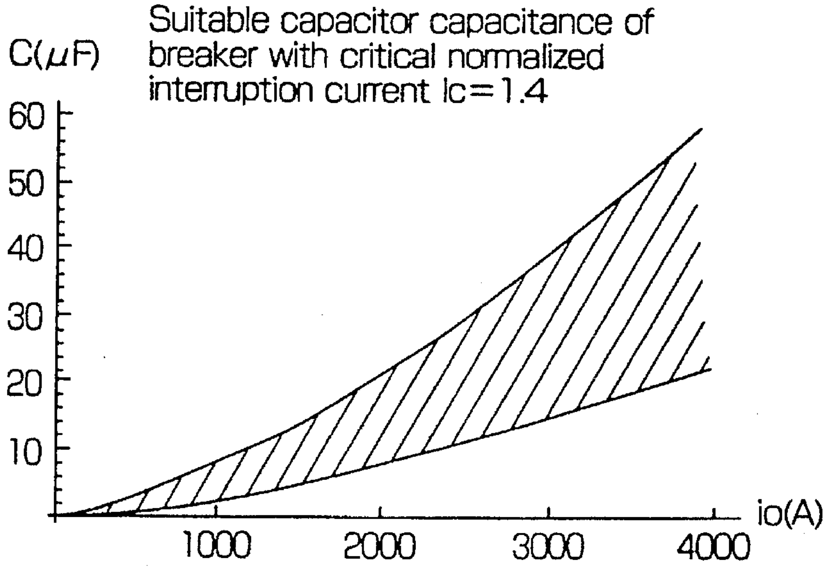
FIG. 17 is a diagram showing the zone of small parallel-capacitor capacitance C (μF) suitable for the interruption current $i_o$ of the invention.

FIGS. 16 and 17 illustrate respective zones of the suitable parallel-reactor inductance L (μH) and suitable small parallel-capacitor capacitance C (μF) relative to the interruption current $i_o$ in a 550 kV-class circuit breaker having the critical normalized interruption current $I_c$=1.4. As apparent from these diagrams, when a puffer type gas circuit breaker of the critical normalized interruption current $I_c$=1.4 is employed with a DC interruption current value of at 2,000 A, the parallel-reactor inductance L being coupled to this circuit breaker as the parallel impedance means therefor ranges from 232 to 622 μH; preferably 305 to 501 μH; more preferably, 380 μH (the optimum value). The parallel-capacitor capacitance C in this case may range from 8.0 to 21.4 μF; preferably, 8.0 to 14.7 μF, 8.0 μF being the minimum value. Alternatively, when a puffer type gas circuit breaker of the critical normalized interruption current $I_c$=1.4 having a DC interruption current value of 3,500 A is employed, the parallel reactor inductance L being coupled to this circuit breaker as the parallel capacitance means therefor may range from 175 to 470 μH; preferably 230 to 379 μH; more preferably, 287 μH (the optimum value). The parallel capacitor capacitance C in this case may range from 18.4 to 49.2 μF; preferably, 18.4 to 33.8 μF, 18.4 μF being the minimum value.

Figure 18:
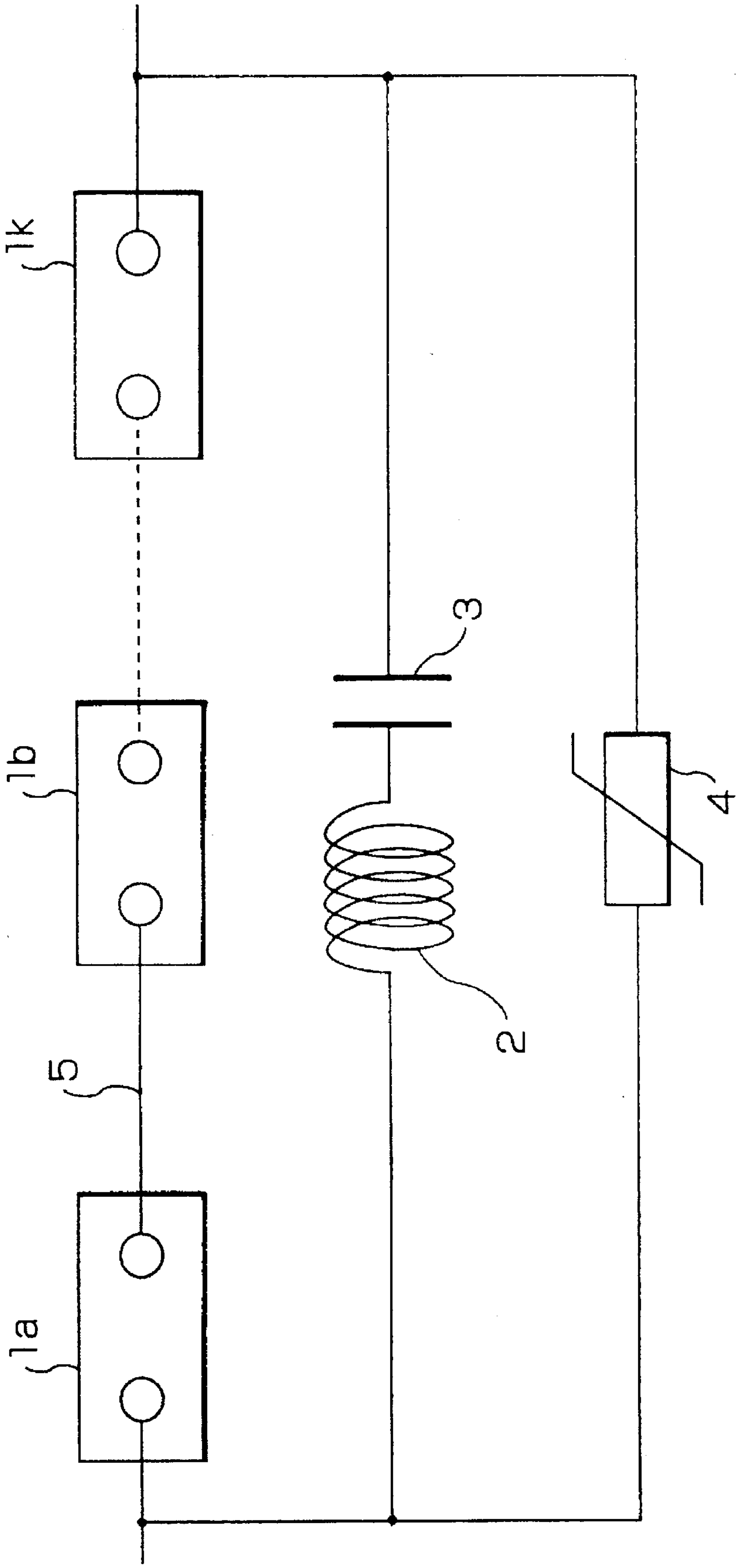
FIG. 18 depicts a circuit configuration of an arrangement for a DC circuit breaker in accordance with another embodiment of the invention, wherein a number (k) of circuit breakers are connected in series to one another.

Turning now to FIG. 18, an arrangement for a DC circuit breaker device in accordance with a further embodiment of the invention is illustrated as a schematic circuit diagram. This circuit breaker is specifically arranged to include a plurality of circuit breakers that are connected to one another in series in order to attain an effective distribution of their interruption ability causing the device to further enhance its high-voltage characteristics, which is advantageous when the power system increases in capacity. More specifically, the DC circuit breaker section of this embodiment consists of a certain number (k, a positive integer) of series-connected circuit breakers 1*a*, 1*b*, . . . , 1*k*. These circuit breakers 1*a*–1*k* have abilities which are substantially identical: the ability may be determined by the average loss of arc energy $n_s$ and the average arc time constant Θ of respective breakers. The series array of circuit breakers 1*a*–1*k* is connected in parallel with a parallel impedance means having a parallel reactor 2 and a parallel capacitor 3. An energy-absorbing element 4 for the parallel capacitor 3 is coupled in parallel to the parallel impedance means. The series of circuit breakers 1*a*–1*k* are arranged so that they open and close between their fixed and movable contacts substantially simultaneously.

The rest of the description will be devoted to an explanation of how the values of the parallel reactor and the parallel capacitor should be determined in this embodiment of the device which employs k series-connected circuit breakers 1*a*–1*k*. In this case, the whole circuit breaker section may be considered to be equivalent to a single DC circuit breaker having the arc time constant Θ with its arc energy loss being set at $kn_s$ ($n=kn_s$ where n is the arc energy loss of one DC circuit breaker). Accordingly, in this embodiment too, exactly the same relational equations may be established by replacing the parallel capacitor capacitance C (μF) in the first embodiment of the device which has only one breaker by C/k (μF).

More specifically, in the embodiment device with k series-connected circuit breakers of substantially the same ability, a suitable parallel-reactor inductance and a suitable small parallel-capacitor capacitance may be determined by use of the following equations:

$$2.2 \leqq k_1 \left( \frac{L}{kC} \right)^{0.5} \leqq 3.6, \tag{31}$$

$$2.2 \leqq k_2 \left( \frac{1}{kLC} \right)^{0.5} \leqq 3.6, \tag{32}$$

where $k_1$, $k_2$ are given by the equations (21), (22) presented above. Note here that $i_o$ in this case is the DC interruption current value (measured in A), $I_c$ is the critical normalized interruption current capable of being interrupted by one of the circuit breakers 1*a*–1*k*, and the normalized interruption current $I_o$ is defined as $$I_o = \frac{i_o}{\sqrt{kn_sC/\Theta}} \tag{33}$$

where $n_s$ is the loss of arc energy generated at the time of interruption in one circuit breaker, and Θ is the arc time constant.

Figure 19:
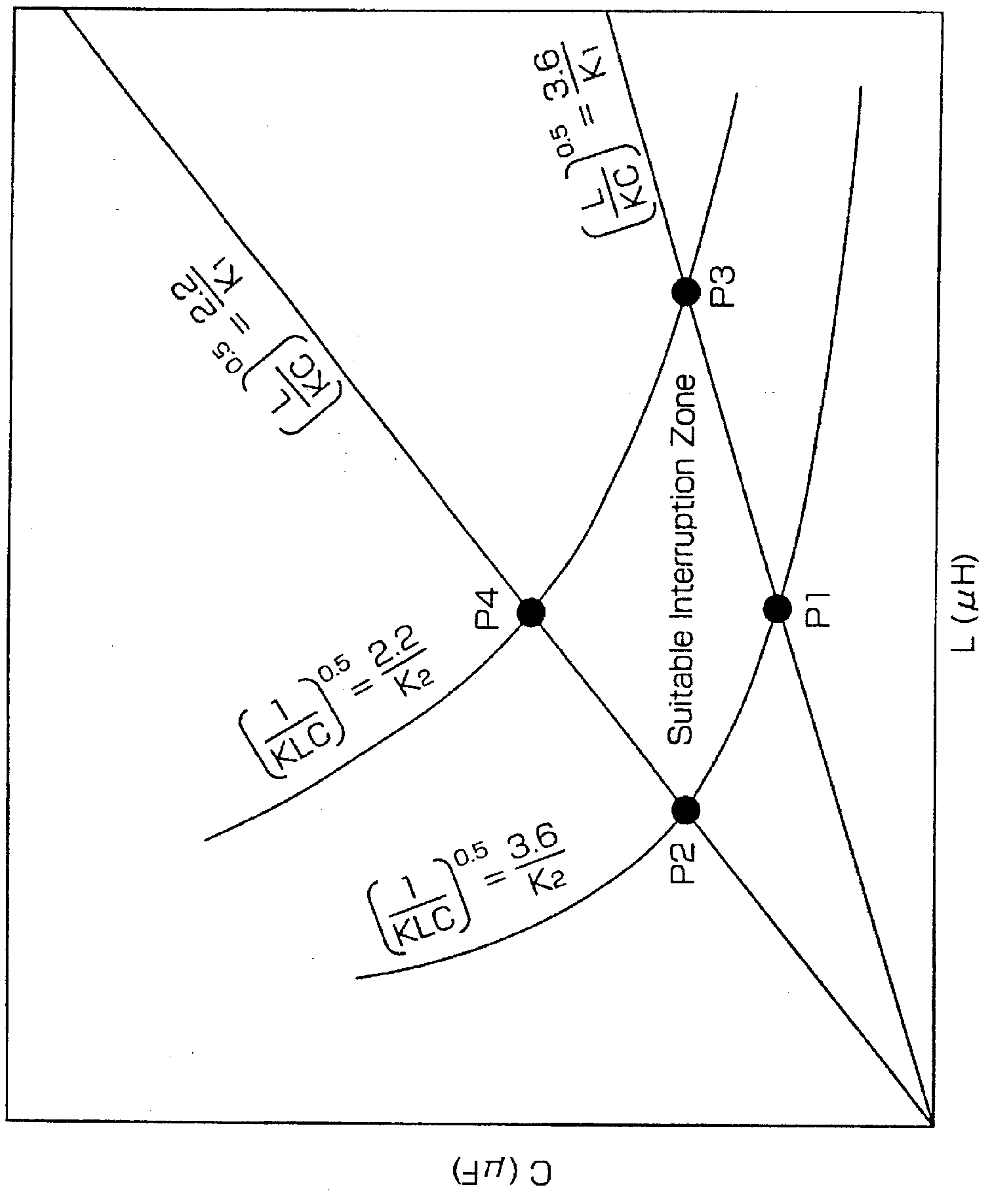
FIG. 19 is a diagram showing the zone of parallel-reactor inductance and small parallel-capacitor capacitance suitable for the achievement of current interruption in the embodiment of the device of FIG. 18 with k series-connected circuit breakers.

FIG. 19 shows a suitable interruption zone by indicating respective zones of the suitable parallel-reactor inductance exhibiting a shortened interruption time of short arc time and of the suitable small parallel-capacitor capacitance exhibiting short interruption time of short arc time in the second embodiment having k series-connected circuit breakers 1*a*–1*k* of substantially the same ability, wherein correlations of the equations (31), (32) are shown with respect to the parallel reactor inductance L (μH) and the parallel capacitor capacitance C (μF). In this diagram, a specific zone surrounded by four bent lines defines the suitable interruption zone imparting short interruption time, the zone being generalized so that it can be commonly applied to several circuit breakers of different performances and different interruption current values. The values of $k_1$, $k_2$, and the four cross points P1–P4 of FIG. 19 are defined by the group of equations as set forth in FIG. 20.

Consequently, with the second embodiment wherein k circuit breakers of substantially the same ability are connected to one another in series, it becomes possible by use of the equations (31), (32) to make it easier to appropriately set the suitable parallel-reactor inductance and the suitable small parallel-capacitor capacitance. Additionally, since the equations (31), (32) are not in any way controlled by DC voltages, these equations may be applied throughout almost the full range of DC voltages.

It is therefore evident that this fact brings about the possibility of taking full advantage of the inherent performance abilities of the circuit breakers employed. Here, the suitable parallel-reactor inductance L (μH) exhibiting a shorter interruption time is given, by a range defined between the horizontally opposite cross points P2, P3 of the graph of FIG. 19, as:

$$1.93 \times 10^3 \frac{I_c^5}{i_o^{0.5}} \leqq L \leqq 5.17 \times 10^3 \frac{I_c^5}{i_o^{0.5}}. \tag{34}$$

For such a parallel reactor inductance L (μH) ranging from the point P2 to point P3, the suitable small parallel-capacitor capacitance C (μF) is given by the range of the FIG. 19 diagram defined between the vertically opposite cross points P1, P4 as:

$$\frac{2.44 \times 10^{-4}}{k} \cdot \frac{i_o^{1.5}}{I_c^3} \leqq C \leqq \frac{6.53 \times 10^{-4}}{k} \cdot \frac{i_o^{1.5}}{I_c^3}. \tag{35}$$

Preferably, the suitable parallel-reactor inductance L (μH) should be defined by an intermediate portion of the zone previously determined by the equation (34) which is represented as:

$$2.55 \times 10^3 \frac{I_c^5}{i_o^{0.5}} \leqq L \leqq 4.17 \times 10^3 \frac{I_c^5}{i_o^{0.5}}. \tag{36}$$

Also, the suitable small parallel-capacitor capacitance C (μF) may be defined by as a smaller value in the lower portion of the zone previously determined by the equation (35), that is, represented by $$\frac{2.44 \times 10^{-4}}{k} \cdot \frac{i_o^{1.5}}{I_c^3} \leqq C \leqq \frac{4.49 \times 10^{-4}}{k} \cdot \frac{i_o^{1.5}}{I_c^3}. \tag{37}$$

More preferably, to take maximum advantage of the performance of the circuit breaker, the optimum parallel-reactor inductance L (μH) should be at point P1 to provide the shortest interruption time, wherein the parallel-reactor inductance L (μH) in this case is:

$$L = 3.16 \times 10^3 \frac{I_c^5}{i_o^{0.5}}. \tag{38}$$

The optimum smallest parallel-capacitor capacitance C (μF) should preferably be at the point P1 to exhibit the shortest interruption time, wherein the parallel reactor inductance L (μH) is:

$$C = \frac{2.44 \times 10^{-4}}{k} \cdot \frac{i_o^{1.5}}{I_c^3}. \tag{39}$$

It is generally recommended that reactance values settings be made greater than those above.

From the above discussions, it can be understood that, in the second embodiment circuit breaker with the k series-connected circuit breakers of substantially the same ability, the parallel capacitor capacitance C (μF) can be reduced at 1/k as compared with that of the first embodiment of the device with only one circuit breaker, while allowing the parallel reactor inductance L (μH) to remain unchanged.

It should be noted that, when it is necessary to further increase the capacity of power systems, if the use of an increased number of series-connected circuit breakers of substantially the same ability is considered appropriate rather than the use of a single circuit breaker of increased interruption ability, each circuit breaker may be constituted from a circuit breaker the ability of which is arranged in such a way that the ratio of the average arc energy loss $n_s$ to its average arc time constant Θ is defined by:

$$0.1 \cdot \frac{\mathrm{MW}}{\mu\mathrm{s}} < \frac{n_s}{\Theta} < 1.2 \cdot \frac{MW}{\mu\mathrm{s}} \tag{40}$$

where M indicates $10^6$, W is watt, μ is $10^{-6}$, and s is second.

As has been described above, when the arrangement for a DC circuit breaker device employs k series-connected circuit breakers of substantially the same ability, several advantages can be attained as follows: the device can successfully meet more strict requirements in the accomplishment of enhancing the capacity of power systems; highly improved interruption performance of shorter interruption time can be attained due to the fact that almost full advantage of the performance of circuit breakers can be taken by employing the parallel impedance means having its small parallel-capacitor capacitance properly determined relative to the suitable parallel-reactor inductance L; the size and cost of the device can be decreased.

While the invention has been described with reference to preferred embodiments thereof, it will be understood by those skilled in the art that various modifications and additions may be made therein without departing from the spirit and scope of the invention. Accordingly, the scope of the invention is limited solely by the claims that follow.

What is claimed is:

1. An arrangement for a gas circuit breaker with a reactor and a capacitor connected in series to interrupt a DC current, said arrangement comprising:

- a DC circuit breaker for controlling the flow of DC current in a power system;
- a parallel impedance means connected in parallel with the DC circuit breaker and having a parallel capacitor and a parallel reactor;
- an energy-absorbing element for said parallel capacitor; and
- said parallel reactor having an inductance L (measured in μH) determined to satisfy $$1.93\times10^{3}\frac{I_c^5}{i_o^{0.5}}\leqq L\leqq 5.17\times10^{3}\frac{I_c^5}{i_o^{0.5}}$$

where $i_o$ is an interruption current value of the DC current (measured in amperes), and $I_c$ is a critical normalized interruption current of said DC circuit breaker, while the normalized interruption current $I_o$ is defined as $$I_o=\frac{i_o}{\sqrt{nC/\theta}}$$

where n is an energy loss of are generated when the DC current is interrupted, C is a capacitance of the parallel capacitor, and θ is a time constant of arc.

2. The device according to claim 1, wherein, for the inductance L (μH) of said parallel reactor, said parallel capacitor capacitance C (μF) has a value satisfying:

$$2.44\times10^{-4}\frac{i_o^{1.5}}{I_c^3}\leqq C\leqq 4.49\times10^{-4}\frac{i_o^{1.5}}{I_c^3}.$$

3. The device according to claim 1, wherein, for the inductance L (μH) of said parallel reactor, said parallel capacitor capacitance C (μF) is set based on a value of the formula:

$$2.44\times10^{-4}\frac{i_o^{1.5}}{I_c^3}.$$

4. The device according to claim 1, wherein said DC circuit breaker includes a puffer-type gas circuit breaker, said gas circuit breaker comprising:

- a fixed contact allowing the DC current to flow;
- a movable contact;
- a puffer piston for spraying a chosen gas toward an arc produced between said contacts when they are in an open state, said gas containing a $SF_6$ gas; and a dielectric nozzle.

5. The device according to claim 1, wherein, for the inductance L (μH) of said parallel reactor, said parallel capacitor capacitance C (μF) has a value satisfying:

$$2.44\times10^{-4}\frac{i_o^{1.5}}{I_c^3}\leqq C\leqq 6.53\times10^{-4}\frac{i_o^{1.5}}{I_c^3}.$$

6. The device according to claim 5, wherein said DC circuit breaker is a puffer-type gas circuit breaker, said gas circuit breaker comprising:

- a fixed contact allowing the DC current to flow;
- a movable contact;
- a puffer piston for spraying a chosen gas toward an arc produced between said contacts when they are in an open state, said gas containing a $SF_6$ gas; and
- a dielectric nozzle.

7. The device according to claim 1, wherein the inductance L of said parallel reactor is determined to satisfy:

$$2.55\times10^{3}\frac{I_c^5}{i_o^{0.5}}\leqq L\leqq 4.17\times10^{3}\frac{I_c^5}{i_o^{0.5}}.$$

8. The device according to claim 7, wherein, for the inductance L (μH) of said parallel reactor, said parallel capacitor capacitance C (μF) has a value satisfying:

$$2.44\times10^{-4}\frac{i_o^{1.5}}{I_c^3}\leqq C\leqq 6.53\times10^{-4}\frac{i_o^{1.5}}{I_c^3}.$$

9. The device according to claim 7, wherein, for said inductance L (μH) of said parallel reactor, said parallel capacitor capacitance C (μF) has a value satisfying:

$$2.44\times10^{-4}\frac{i_o^{1.5}}{I_c^3}\leqq C\leqq 4.49\times10^{-4}\frac{i_o^{1.5}}{I_c^3}.$$

10. The device according to claim 7, wherein, for said inductance L (μH) of said parallel reactor, said parallel capacitor capacitance C (μF) is set based on the value of the formula:

$$2.44\times10^{-4}\frac{i_o^{1.5}}{I_c^3}.$$

11. The device according to claim 1, wherein the inductance L of said parallel reactor is set based on the value of the formula:

$$3.16\times10^{3}\frac{I_c^5}{i_o^{0.5}}.$$

12. The device according to claim 11, wherein, for said inductance L (μH) of said parallel reactor, said parallel capacitor capacitance C (μF) has a value satisfying:

$$2.44\times10^{-4}\frac{I_o^{1.5}}{I_c^3}\leqq C\leqq 6.53\times10^{-4}\frac{i_o^{1.5}}{I_c^3}.$$

13. The device according to claim 11, wherein, for said inductance L (μH) of said parallel reactor, said parallel capacitor capacitance C (μF) has a value satisfying $$2.44 \times 10^{-4} \frac{i_o^{1.5}}{I_c^3} \leqq C \leqq 4.49 \times 10^{-4} \frac{i_o^{1.5}}{I_c^3}.$$

14. The device according to claim 11, wherein, for said inductance L (μH) of said parallel reactor, said parallel capacitor capacitance C (μF) is set based on a value of the formula:

$$2.44 \times 10^{-4} \frac{i_o^{1.5}}{I_c^3}.$$

15. An arrangement for a gas circuit breaker with a reactor and a capacitor connected in series to interrupt a DC current, said arrangement comprising:

a plurality of series-connected DC circuit breakers of substantially the same ability for controlling a flow of DC current in a power system;

a parallel impedance means connected in parallel with the DC circuit breakers and having a parallel capacitor and a parallel reactor;

an energy-absorbing element for said parallel capacitor;

said parallel reactor having an inductance L (measured in μH) determined to satisfy $$1.93 \times 10^3 \frac{I_c^5}{i_o^{0.5}} \leqq L \leqq 5.17 \times 10^3 \frac{I_c^5}{i_o^{0.5}}$$

where $i_o$ is the an interruption current value of the DC current (measured in amperes), $I_c$ is the critical normalized interruption current of the DC circuit breaker;

said parallel capacitor capacitance C (μF) having a value determined to satisfy $$\frac{2.44 \times 10^{-4}}{k} \cdot \frac{i_o^{1.5}}{I_c^3} \leqq C \leqq \frac{6.53 \times 10^{-4}}{k} \cdot \frac{i_o^{1.5}}{I_c^3}$$

and the normalized interruption current $I_o$ is defined as $$\frac{i_o}{\sqrt{k n_s C/\theta}}$$

where k is a number of said DC circuit breakers, $n_s$ is the energy loss of arc generated when the DC current is interrupted in one of said circuit breakers, and θ is a time constant of arc.

16. The device according to claim 15, wherein said parallel reactor inductance L (μH) has a value determined to satisfy $$2.55 \times 10^3 \frac{I_c^5}{i_o^{0.5}} \leqq L \leqq 4.17 \times 10^3 \frac{I_c^5}{i_0^{0.5}}$$

and wherein said parallel capacitor capacitance C (μF) has a value determined to satisfy $$\frac{2.44 \times 10^{-4}}{k} \cdot \frac{i_o^{1.5}}{I_c^3} \leqq C \leqq \frac{4.49 \times 10^{-4}}{k} \cdot \frac{i_o^{1.5}}{I_c^3}.$$

17. The device according to claim 15, wherein said parallel reactor inductance L (μH) is set based on the value of the following formula:

$$3.16 \times 10^3 \frac{I_c^5}{i_o^{0.5}}$$

and wherein said parallel capacitor capacitance C (μF) is set based on the value of the following formula:

$$\frac{2.44 \times 10^{-4}}{k} \cdot \frac{i_o^{1.5}}{I_c^3}.$$

18. A reactance setting method for use in an arrangement for a gas circuit breaker comprising a DC circuit breaker for controlling the flow of DC current in a power system, a parallel impedance means connected in parallel with the DC circuit breaker and having a parallel capacitor and a parallel reactor, and an energy-absorbing element for said parallel capacitor, said method comprising the steps of:

providing a normalized interruption current $I_o$ being defined as $$\frac{i_o}{\sqrt{nC/\theta}},$$

where $i_o$ is an interruption current value of the DC current (measured in amperes); n is an energy loss of arc generated when the DC current is interrupted; C is a capacitance of the parallel capacitor, and e is the time constant of arc; a parameter $k_1$ is substantially equal to $$\frac{(i_o/1000)}{I_c^4};$$

a parameter $k_2$ is substantially equal to $$\frac{(i_o/1000)^{0.5} I_c}{10^4}; \text{and}$$

determining a parallel capacitor capacitance C (μF) and a parallel reactor inductance L (μH) to satisfy $$2.2 \leqq k_1 \left(\frac{L}{C}\right)^{0.5} \leqq 3.6,$$

$$2.2 \leqq k_2 \left(\frac{1}{LC}\right)^{0.5} \leqq 3.6.$$

* * * * *